(12) United States Patent
Khazeni

(10) Patent No.: US 7,545,556 B2
(45) Date of Patent: Jun. 9, 2009

(54) METHOD AND APPARATUS FOR MEASURING THE FORCE OF STICTION OF A MEMBRANE IN A MEMS DEVICE

(75) Inventor: Kasra Khazeni, San Jose, CA (US)

(73) Assignee: Qualcomm Mems Technologies, Inc., San Diego, CA (US)

( * ) Notice: Subject to any disclaimer, the term of this patent is extended or adjusted under 35 U.S.C. 154(b) by 214 days.

(21) Appl. No.: 11/614,795

(22) Filed: Dec. 21, 2006

(65) Prior Publication Data

US 2008/0150517 A1    Jun. 26, 2008

(51) Int. Cl.
*G02B 26/00* (2006.01)
(52) U.S. Cl. .................. 359/291; 359/290
(58) Field of Classification Search ............ 359/290, 359/291
See application file for complete search history.

(56) References Cited

U.S. PATENT DOCUMENTS

| | | |
|---|---|---|
| 5,175,772 A | 12/1992 | Kahn et al. |
| 5,559,358 A | 9/1996 | Burns et al. |
| 5,654,819 A | 8/1997 | Goossen et al. |
| 5,767,666 A * | 6/1998 | Asada et al. ............ 324/97 |
| 6,040,937 A | 3/2000 | Miles |
| 6,285,207 B1 | 9/2001 | Listwan |
| RE37,847 E | 9/2002 | Henley et al. |

(Continued)

FOREIGN PATENT DOCUMENTS

GB    2 217 839    11/1989

(Continued)

OTHER PUBLICATIONS

Aratani et al., "Process and Design Considerations for Surface Micromachined Beams for a Tuneable Interferometer Array in Silicon," Proc. IEEE Microelectromechanical Workshop, Fort Lauderdale, FL, pp. 230-235 (Feb. 1993).

(Continued)

*Primary Examiner*—Jessica T Stultz
*Assistant Examiner*—Mahidere S Sahle
(74) *Attorney, Agent, or Firm*—Knobbe Martens Olson & Bear, LLP

(57) ABSTRACT

Disclosed are methods and systems for testing MEMS devices (e.g., interferometric modulators) so as to induce a moveable element to move from a first position to a second position and to detect the movement. The methods include applying an electrical current to the movable element in the presence of a magnetic field, thereby producing a Lorentz force on the movable element. The force required to move the movable element from the first position to the second position can then be estimated based on the magnitudes and geometric relationships of the electrical current and the magnetic field, and the geometry of the movable element. In some embodiments, the first position may be a movable element adhered to another surface (e.g., a layer on a substrate) due to stiction forces. In these embodiments, the stiction forces can be estimated. In other embodiments, the first position may be a relaxed position, where the movable element is spaced a first distance from a substrate, and the second position may be a second distance from the substrate and/or contacting the substrate. In these embodiments, the springiness (e.g., a spring constant) of support structures supporting the movable element can be estimated.

42 Claims, 15 Drawing Sheets

U.S. PATENT DOCUMENTS

| | | |
|---|---|---|
| 6,567,715 B1 | 5/2003 | Sinclair et al. |
| 6,674,090 B1 | 1/2004 | Chua et al. |
| 6,674,562 B1 | 1/2004 | Miles |
| 6,950,193 B1 | 9/2005 | Discenzo |
| 7,123,216 B1 | 10/2006 | Miles |
| 7,187,489 B2 | 3/2007 | Miles |
| 2002/0157033 A1 | 10/2002 | Cox |
| 2005/0046919 A1 | 3/2005 | Taguchi et al. |
| 2006/0066856 A1 | 3/2006 | Cummings et al. |
| 2006/0066863 A1 | 3/2006 | Cummings et al. |
| 2006/0066935 A1 | 3/2006 | Cummings et al. |
| 2006/0067652 A1 | 3/2006 | Cummings et al. |
| 2006/0077401 A1 | 4/2006 | Kothari et al. |
| 2006/0077523 A1 | 4/2006 | Cummings et al. |
| 2006/0103643 A1 | 5/2006 | Mathew et al. |
| 2007/0097134 A1 | 5/2007 | Miles |
| 2007/0194414 A1 | 8/2007 | Chou |
| 2008/0002210 A1 | 1/2008 | Djordjev |
| 2008/0088638 A9 | 4/2008 | Miles |
| 2008/0180680 A1 | 7/2008 | Cummings et al. |

FOREIGN PATENT DOCUMENTS

| | | |
|---|---|---|
| WO | WO 97/17628 | 5/1997 |

OTHER PUBLICATIONS

Aratani et al., "Surface Micromachined Tuneable Interferometer Array," Sensors and Actuators, pp. 17-23 (1994).

Conner, "Hybrid Color Display Using Optical Interference Filter Array," SID Digest, pp. 577-580 (1993).

Durr et al., "Reliability Test and Failure Analysis of Optical MEMS", Proceedings of the 9th International Symposium on the Physical and Failure Analysis of Integrated Circuits, pp. 201-206, (Jul. 8-12, 2002).

Raley et al., "A Fabry-Perot Microinterferometer for Visible Wavelengths," IEEE Solid-State Sensor and Actuator Workshop, Hilton Head, SC (1992).

Skaggs et al, "Automatic Testing of the Digital Micromirror Device", IEEE/LEOS 1996 Summer Topical Meetings, pp. 11-12, (Aug. 5-9, 1996).

Srikar et al., "A Critical Review of Microscale Mechnical Testing Methods Used in the Design of Microelectromechanical Systems," *Society for Experimental mechanics*, vol. 43, No. 3, (2003).

ISR and WO for PCT/US07/025615, filed Dec. 12, 2007.

\* cited by examiner

METHOD AND APPARATUS FOR MEASURING THE FORCE OF STICTION OF A MEMBRANE IN A MEMS DEVICE

BACKGROUND OF THE INVENTION

1. Field of the Invention

This invention relates to microelectromechanical systems. More particularly, this invention relates to methods and apparatus for improving the performance of microelectromechanical systems such as interferometric modulators.

2. Description of the Related Art

Microelectromechanical systems (MEMS) include micro mechanical elements, actuators, and electronics. Micromechanical elements may be created using deposition, etching, and or other micromachining processes that etch away parts of substrates and/or deposited material layers or that add layers to form electrical and electromechanical devices. One type of MEMS device is called an interferometric modulator. As used herein, the term interferometric modulator or interferometric light modulator refers to a device that selectively absorbs and/or reflects light using the principles of optical interference. In certain embodiments, an interferometric modulator may comprise a pair of conductive plates, one or both of which may be transparent and/or reflective in whole or part and capable of relative motion upon application of an appropriate electrical signal. In a particular embodiment, one plate may comprise a stationary layer deposited on a substrate and the other plate may comprise a metallic membrane separated from the stationary layer by an air gap. As described herein in more detail, the position of one plate in relation to another can change the optical interference of light incident on the interferometric modulator. Such devices have a wide range of applications, and it would be beneficial in the art to utilize and/or modify the characteristics of these types of devices so that their features can be exploited in improving existing products and creating new products that have not yet been developed.

SUMMARY OF THE INVENTION

The system, method, and devices of the invention each have several aspects, no single one of which is solely responsible for its desirable attributes. Without limiting the scope of this invention, its more prominent features will now be discussed briefly. After considering this discussion, and particularly after reading the section entitled "Detailed Description of Certain Embodiments" one will understand how the features of this invention provide advantages over other display devices.

An embodiment provides a method of testing an array of interferometric modulators. The method of this embodiment includes applying an electrical current to an electrode connected to an adhered movable reflective element of an array of interferometric modulators, where the array comprises a plurality of interferometric modulators, with each interferometric modulator comprising one or more movable reflective elements, the movable reflective elements being spaced apart from a substrate in a relaxed state and contacting a surface in an actuated state, wherein at least one of the movable reflective elements is adhered to the surface in the actuated state. The method also includes applying a magnetic field to the array, and detecting movement of the adhered movable reflective element.

Another embodiment provides a method of testing a MEMS device. The method of this embodiment includes applying an electrical current to a conductive movable element of the MEMS device, applying a magnetic field to the conductive movable element, and detecting movement of the conductive movable element. Aspects of this embodiment may include where the conductive movable element is formed over a substrate and separated from the substrate by a first distance in a first state, and configured to be movable to be separated from the substrate by a second distance in a second state, with the method further including applying the electrical current and the magnetic field when the movable element is in the first state thereby causing the movable element to move to the second state.

Another embodiment provides a system for testing an array of interferometric modulators. The system of this embodiment includes a power source configured to apply an electrical current to an electrode connected to an adhered movable reflective element of an array of interferometric modulators. The array includes a plurality of interferometric modulators comprising one or more movable reflective elements, the movable reflective elements being spaced apart from a substrate in a relaxed state and contacting a surface in an actuated state, where at least one of the movable reflective elements is adhered to the surface in the actuated state. The system also includes a magnetic field generator configured to apply a magnetic field to the array, and an optical detector configured to detect light reflected from the array and produce a signal corresponding to the detected light, and a computer configured to receive the signal from the optical detector and determine movement of the adhered movable reflective element.

Another embodiment provides a system for testing a MEMS device. The system of this embodiment includes a power source configured to apply an electrical current to a conductive movable element of the MEMS device, a magnetic field generator configured to apply a magnetic field to the conductive movable element, and an optical system configured to detect movement of the movable element. Aspects of this embodiment may include a computer coupled to the power source and configured to cause the power source to apply an electrical current waveform.

The Figures are schematic only, not drawn to scale.

DETAILED DESCRIPTION OF CERTAIN EMBODIMENTS

The following detailed description is directed to certain specific embodiments of the invention. However, the invention can be embodied in a multitude of different ways. In this description, reference is made to the drawings wherein like parts are designated with like numerals throughout. As will be apparent from the following description, the embodiments may be implemented in any device that is configured to display an image, whether in motion (e.g., video) or stationary (e.g., still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

Embodiments provide methods and systems for testing MEMS devices (e.g., interferometric modulators) so as to induce a moveable element to move from a first position to a second position and to detect the movement. The methods include applying an electrical current to the movable element in the presence of a magnetic field, thereby producing a Lorentz force on the movable element. The force required to move the movable element from the first position to the second position can be estimated based on the magnitudes and geometric relationships of the electrical current and the magnetic field, and the geometry of the movable element. In some embodiments, the first position may be a movable element adhered to another surface (e.g., a layer on a substrate) due to stiction forces. In these embodiments, the stiction forces can be estimated. In other embodiments, the first position may be a relaxed position, where the movable element is spaced a first distance from a substrate, and the second position may be a second distance from the substrate and/or contacting the substrate. In these embodiments, the springiness (e.g., a spring constant) of support structures supporting the movable element can be estimated.

Figure 1:
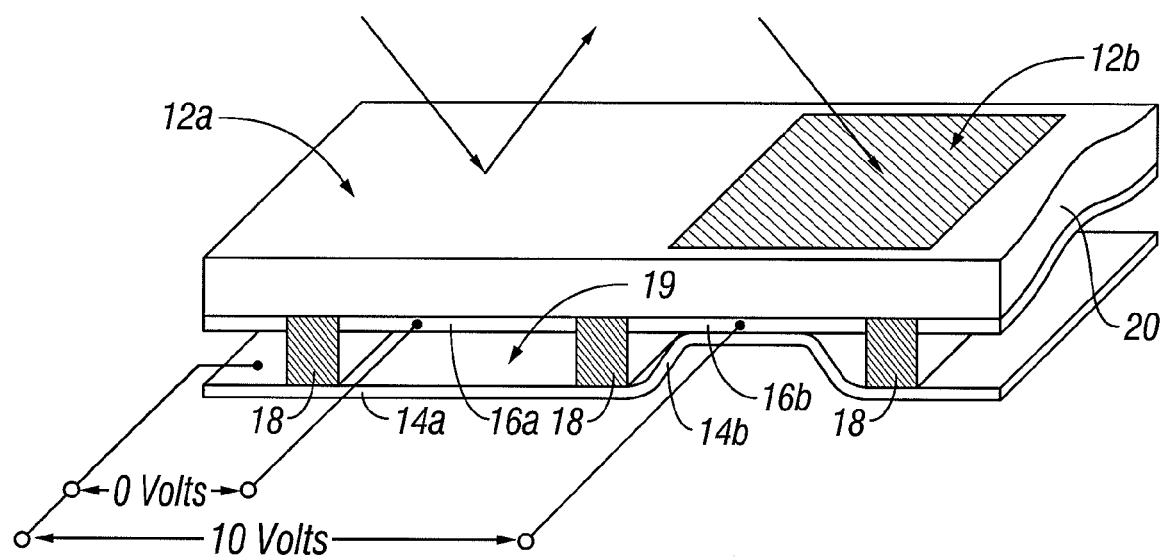
FIG. 1 is an isometric view depicting a portion of one embodiment of an interferometric modulator display in which a movable reflective layer of a first interferometric modulator is in a relaxed position and a movable reflective layer of a second interferometric modulator is in an actuated position.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical cavity with at least one variable dimension. In one embodiment, one of the reflective layers may be moved between two positions. In the first position, referred to herein as the relaxed position, the movable reflective layer is positioned at a relatively large distance from a fixed partially reflective layer. In the second position, referred to herein as the actuated position, the movable reflective layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable reflective layer 14a is illustrated in a relaxed position at a predetermined distance from an optical stack 16a, which includes a partially reflective layer. In the interferometric modulator 12b on the right, the movable reflective layer 14b is illustrated in an actuated position adjacent to the optical stack 16b.

The optical stacks 16a and 16b (collectively referred to as optical stack 16), as referenced herein, typically comprise of several fused layers, which can include an electrode layer, such as indium tin oxide (ITO), a partially reflective layer, such as chromium, and a transparent dielectric. The optical stack 16 is thus electrically conductive, partially transparent and partially reflective, and may be fabricated, for example, by depositing one or more of the above layers onto a transparent substrate 20. The partially reflective layer can be formed from a variety of materials that are partially reflective such as various metals, semiconductors, and dielectrics. The partially reflective layer can be formed of one or more layers of materials, and each of the layers can be formed of a single material or a combination of materials.

In some embodiments, the layers of the optical stack are patterned into parallel strips, and may form row electrodes in a display device as described further below. The movable reflective layers 14a, 14b may be formed as a series of parallel strips of a deposited metal layer or layers (orthogonal to the row electrodes of 16a, 16b) deposited on top of posts 18 and an intervening sacrificial material deposited between the posts 18. When the sacrificial material is etched away, the movable reflective layers 14a, 14b are separated from the optical stacks 16a, 16b by a defined gap 19. A highly conductive and reflective material such as aluminum may be used for the reflective layers 14, and these strips may form column electrodes in a display device.

With no applied voltage, the cavity 19 remains between the movable reflective layer 14a and optical stack 16a, with the movable reflective layer 14a in a mechanically relaxed state, as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable reflective layer 14 is deformed and is forced against the optical stack 16. A dielectric layer (not illustrated in this Figure) within the optical stack 16 may prevent shorting and control the separation distance between layers 14 and 16, as illustrated by pixel 12b on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

FIGS. 2 through 5B illustrate one exemplary process and system for using an array of interferometric modulators in a display application.

Figure 2:
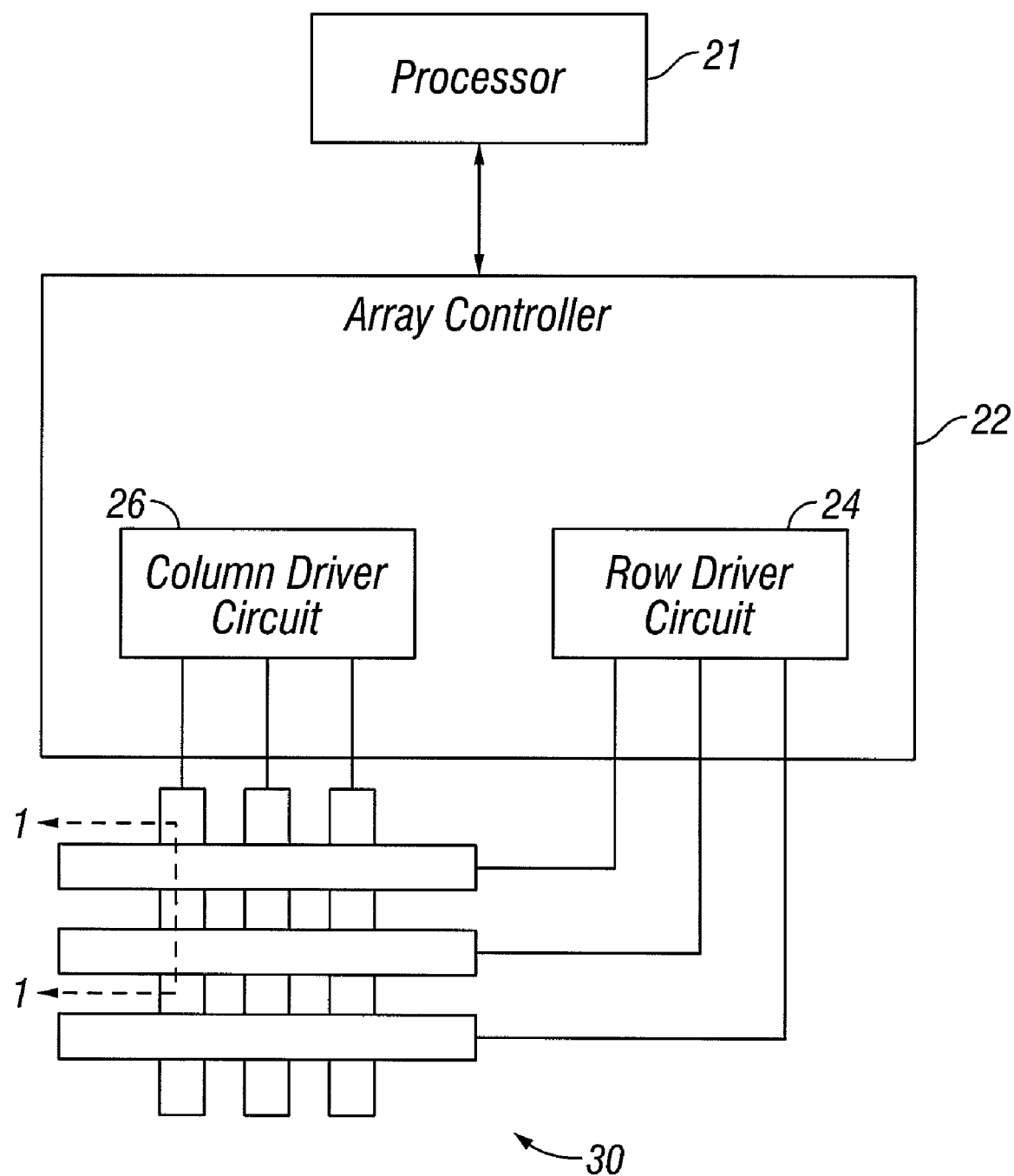
FIG. 2 is a system block diagram illustrating one embodiment of an electronic device incorporating a 3×3 interferometric modulator display.

FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

Figures 3, 4:
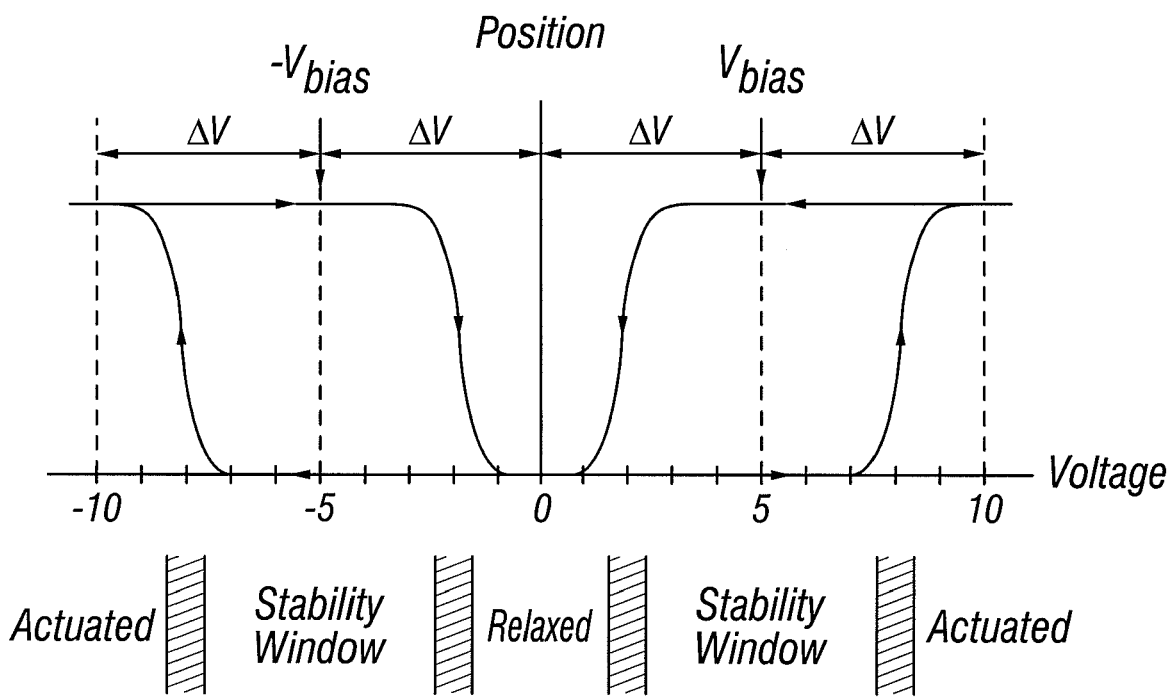
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.

In one embodiment, the processor 21 is also configured to communicate with an array driver 22. In one embodiment, the array driver 22 includes a row driver circuit 24 and a column driver circuit 26 that provide signals to a display array or panel 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the relaxed state to the actuated state. However, when the voltage is reduced from that value, the movable layer maintains its state as the voltage drops back below 10 volts. In the exemplary embodiment of FIG. 3, the movable layer does not relax completely until the voltage drops below 2 volts. There is thus a range of voltage, about 3 to 7 V in the example illustrated in FIG. 3, where there exists a window of applied voltage within which the device is stable in either the relaxed or actuated state. This is referred to herein as the "hysteresis window" or "stability window." It should be noted that FIG. 3 illustrates an ideal embodiment, where the movable layer exhibits no movement due to voltage potential differences within the hysteresis window. In some embodiments, the movable layer may exhibit some small displacement or deformation while the applied voltage is being raised or lowered in the hysteresis window, before quickly displacing to the actuated or relaxed state when the voltage potential difference exceeds the hysteresis window. For a display array having the hysteresis characteristics of FIG. 3, the row/column actuation protocol can be designed such that during row strobing, pixels in the strobed row that are to be actuated are exposed to a voltage difference of about 10 volts, and pixels that are to be relaxed are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or relaxed pre-existing state. Since each pixel of the interferometric modulator, whether in the actuated or relaxed state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figure 5A:
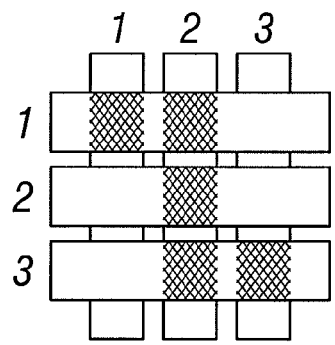
FIG. 5A illustrates one exemplary frame of display data in the 3×3 interferometric modulator display of FIG. 2.
Figure 5B:
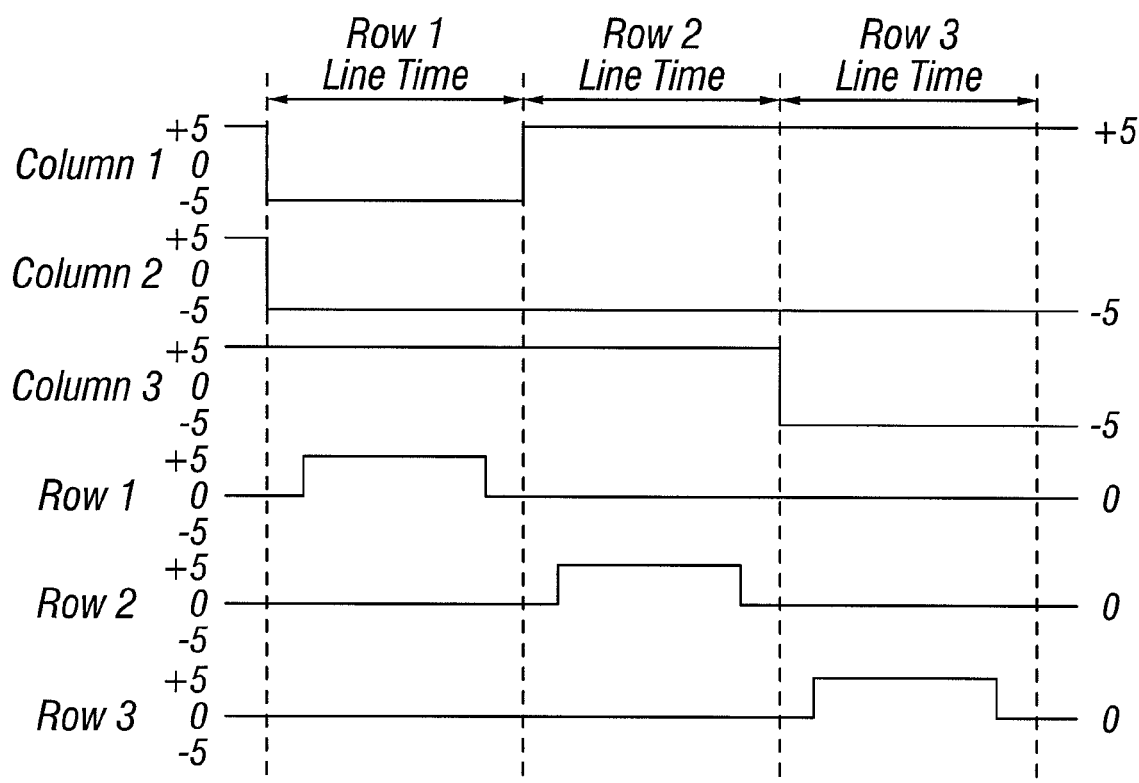
FIG. 5B illustrates one exemplary timing diagram for row and column signals that may be used to write the frame of FIG. 5A.

FIGS. 4, 5A, and 5B illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to −5 volts and +5 volts respectively Relaxing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$. As is also illustrated in FIG. 4, it will be appreciated that voltages of opposite polarity than those described above can be used, e.g., actuating a pixel can involve setting the appropriate column to $+V_{bias}$, and the appropriate row to $-\Delta V$. In this embodiment, releasing the pixel is accomplished by setting the appropriate column to $-V_{bias}$, and the appropriate row to the same $-\Delta V$, producing a zero volt potential difference across the pixel.

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or relaxed states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and relaxes the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and relax pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the systems and methods described herein.

Figure 6A:
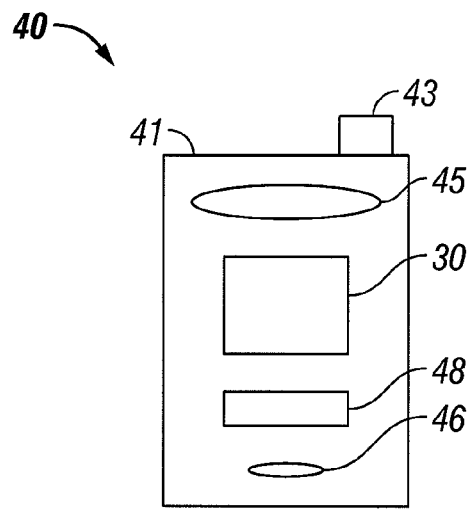
FIGS. 6A and 6B are system block diagrams illustrating an embodiment of a visual display device comprising a plurality of interferometric modulators.
Figure 6B:
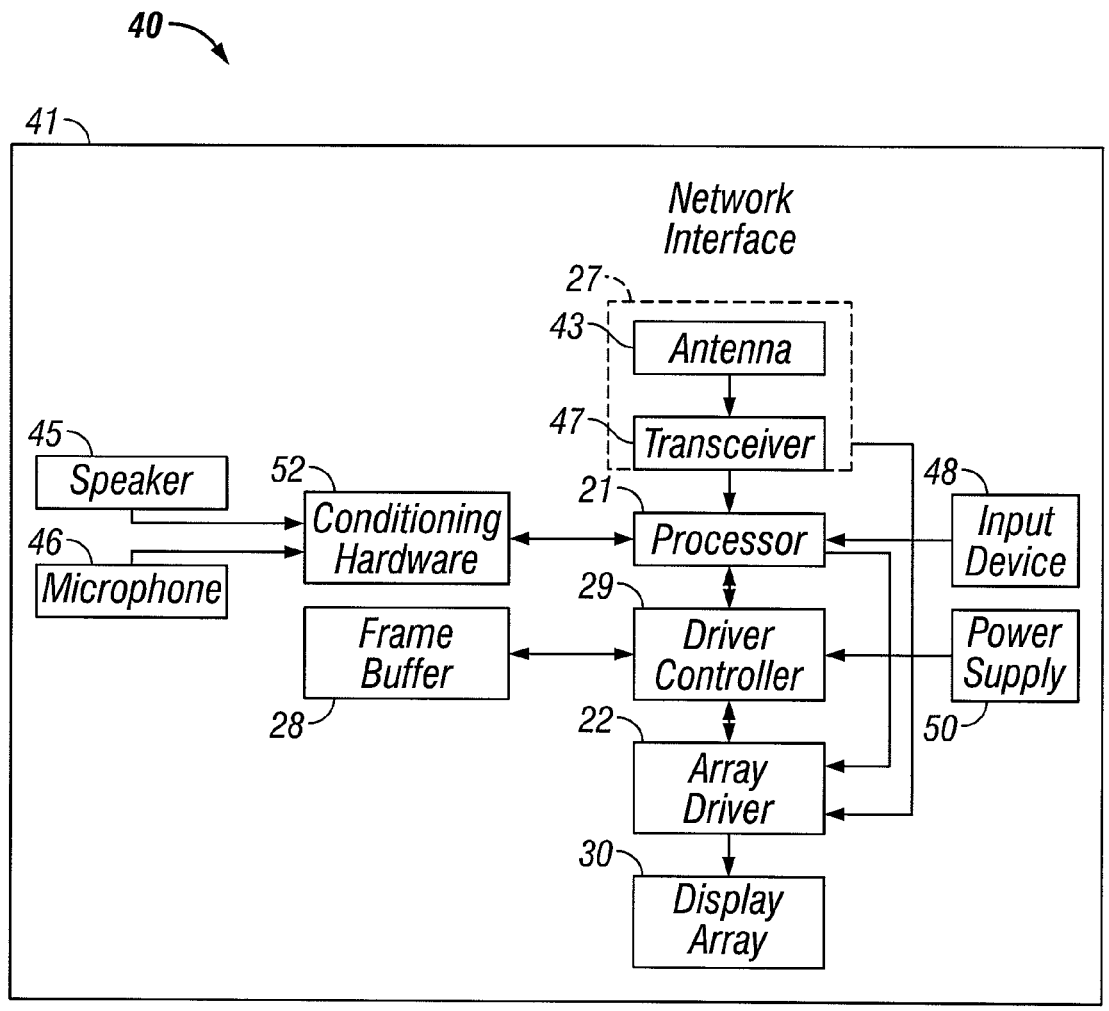

FIGS. 6A and 6B are system block diagrams illustrating an embodiment of a display device 40. The display device 40 can be, for example, a cellular or mobile telephone. However, the same components of display device 40 or slight variations thereof are also illustrative of various types of display devices such as televisions and portable media players.

The display device 40 includes a housing 41, a display 30, an antenna 43, a speaker 45, an input device 48, and a microphone 46. The housing 41 is generally formed from any of a variety of manufacturing processes as are well known to those of skill in the art, including injection molding, and vacuum forming. In addition, the housing 41 may be made from any of a variety of materials, including but not limited to plastic, metal, glass, rubber, and ceramic, or a combination thereof. In one embodiment the housing 41 includes removable portions (not shown) that may be interchanged with other removable portions of different color, or containing different logos, pictures, or symbols.

The display 30 of exemplary display device 40 may be any of a variety of displays, including a bi-stable display, as described herein. In other embodiments, the display 30 includes a flat-panel display, such as plasma, EL, OLED, STN LCD, or TFT LCD as described above, or a non-flat-panel display, such as a CRT or other tube device, as is well known to those of skill in the art. However, for purposes of describing the present embodiment, the display 30 includes an interferometric modulator display, as described herein.

The components of one embodiment of exemplary display device 40 are schematically illustrated in FIG. 6B. The illustrated exemplary display device 40 includes a housing 41 and can include additional components at least partially enclosed therein. For example, in one embodiment, the exemplary display device 40 includes a network interface 27 that includes an antenna 43 which is coupled to a transceiver 47. The transceiver 47 is connected to a processor 21, which is connected to conditioning hardware 52. The conditioning hardware 52 may be configured to condition a signal (e.g. filter a signal). The conditioning hardware 52 is connected to a speaker 45 and a microphone 46. The processor 21 is also connected to an input device 48 and a driver controller 29. The driver controller 29 is coupled to a frame buffer 28, and to an array driver 22, which in turn is coupled to a display array 30. A power supply 50 provides power to all components as required by the particular exemplary display device 40 design.

The network interface 27 includes the antenna 43 and the transceiver 47 so that the exemplary display device 40 can communicate with one ore more devices over a network. In one embodiment the network interface 27 may also have some processing capabilities to relieve requirements of the processor 21. The antenna 43 is any antenna known to those of skill in the art for transmitting and receiving signals. In one embodiment, the antenna transmits and receives RF signals according to the IEEE 802.11 standard, including IEEE 802.11(a), (b), or (g). In another embodiment, the antenna transmits and receives RF signals according to the BLUETOOTH standard. In the case of a cellular telephone, the antenna is designed to receive CDMA, GSM, AMPS or other known signals that are used to communicate within a wireless cell phone network. The transceiver 47 pre-processes the signals received from the antenna 43 so that they may be received by and further manipulated by the processor 21. The transceiver 47 also processes signals received from the processor 21 so that they may be transmitted from the exemplary display device 40 via the antenna 43.

In an alternative embodiment, the transceiver 47 can be replaced by a receiver. In yet another alternative embodiment, network interface 27 can be replaced by an image source, which can store or generate image data to be sent to the processor 21. For example, the image source can be a memory device such as a digital video disc (DVD) or a hard-disc drive that contains image data, or a software module that generates image data.

Processor 21 generally controls the overall operation of the exemplary display device 40. The processor 21 receives data, such as compressed image data from the network interface 27 or an image source, and processes the data into raw image data or into a format that is readily processed into raw image data. The processor 21 then sends the processed data to the driver controller 29 or to frame buffer 28 for storage. Raw data typically refers to the information that identifies the image characteristics at each location within an image. For example, such image characteristics can include color, saturation, and gray-scale level.

In one embodiment, the processor 21 includes a microcontroller, CPU, or logic unit to control operation of the exemplary display device 40. Conditioning hardware 52 generally includes amplifiers and filters for transmitting signals to the speaker 45, and for receiving signals from the microphone 46. Conditioning hardware 52 may be discrete components within the exemplary display device 40, or may be incorporated within the processor 21 or other components.

The driver controller 29 takes the raw image data generated by the processor 21 either directly from the processor 21 or from the frame buffer 28 and reformats the raw image data appropriately for high speed transmission to the array driver 22. Specifically, the driver controller 29 reformats the raw image data into a data flow having a raster-like format, such that it has a time order suitable for scanning across the display array 30. Then the driver controller 29 sends the formatted information to the array driver 22. Although a driver controller 29, such as a LCD controller, is often associated with the system processor 21 as a stand-alone Integrated Circuit (IC), such controllers may be implemented in many ways. They may be embedded in the processor 21 as hardware, embedded in the processor 21 as software, or fully integrated in hardware with the array driver 22.

Typically, the array driver 22 receives the formatted information from the driver controller 29 and reformats the video data into a parallel set of waveforms that are applied many times per second to the hundreds and sometimes thousands of leads coming from the display's x-y matrix of pixels.

In one embodiment, the driver controller 29, array driver 22, and display array 30 are appropriate for any of the types of displays described herein. For example, in one embodiment, driver controller 29 is a conventional display controller or a bi-stable display controller (e.g., an interferometric modulator controller). In another embodiment, array driver 22 is a conventional driver or a bi-stable display driver (e.g., an interferometric modulator display). In one embodiment, a driver controller 29 is integrated with the array driver 22. Such an embodiment is common in highly integrated systems such as cellular phones, watches, and other small area displays. In yet another embodiment, display array 30 is a typical display array or a bi-stable display array (e.g., a display including an array of interferometric modulators).

The input device 48 allows a user to control the operation of the exemplary display device 40. In one embodiment, input device 48 includes a keypad, such as a QWERTY keyboard or a telephone keypad, a button, a switch, a touch-sensitive screen, a pressure- or heat-sensitive membrane. In one embodiment, the microphone 46 is an input device for the exemplary display device 40. When the microphone 46 is used to input data to the device, voice commands may be provided by a user for controlling operations of the exemplary display device 40.

Power supply 50 can include a variety of energy storage devices as are well known in the art. For example, in one embodiment, power supply 50 is a rechargeable battery, such as a nickel-cadmium battery or a lithium ion battery. In another embodiment, power supply 50 is a renewable energy source, a capacitor, or a solar cell, including a plastic solar cell, and solar-cell paint. In another embodiment, power supply 50 is configured to receive power from a wall outlet.

In some implementations control programmability resides, as described above, in a driver controller which can be located in several places in the electronic display system. In some cases control programmability resides in the array driver 22. Those of skill in the art will recognize that the above-described optimization may be implemented in any number of hardware and/or software components and in various configurations.

Figure 7A:
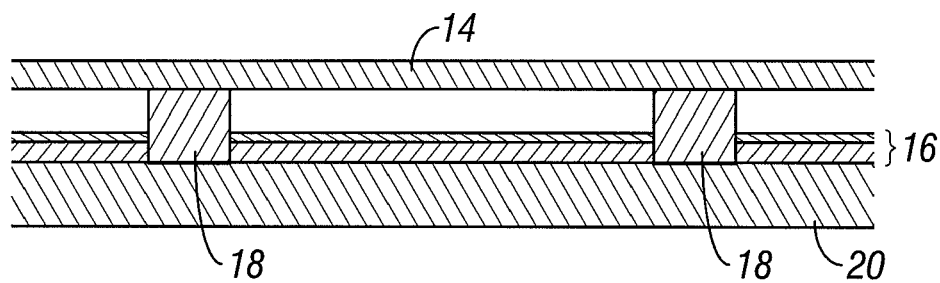
FIG. 7A is a cross section of the device of FIG. 1.
Figure 7B:
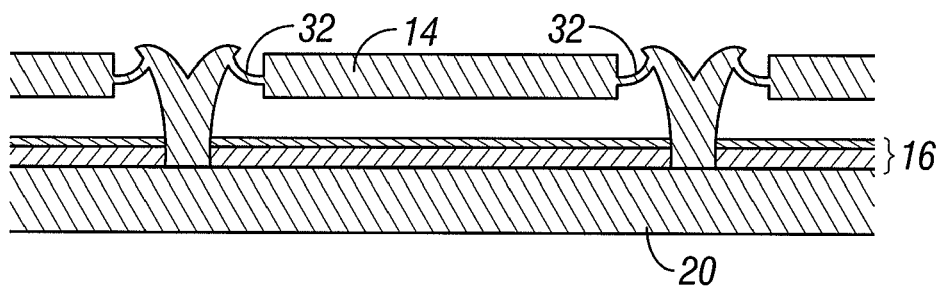
FIG. 7B is a cross section of an alternative embodiment of an interferometric modulator.
Figure 7C:
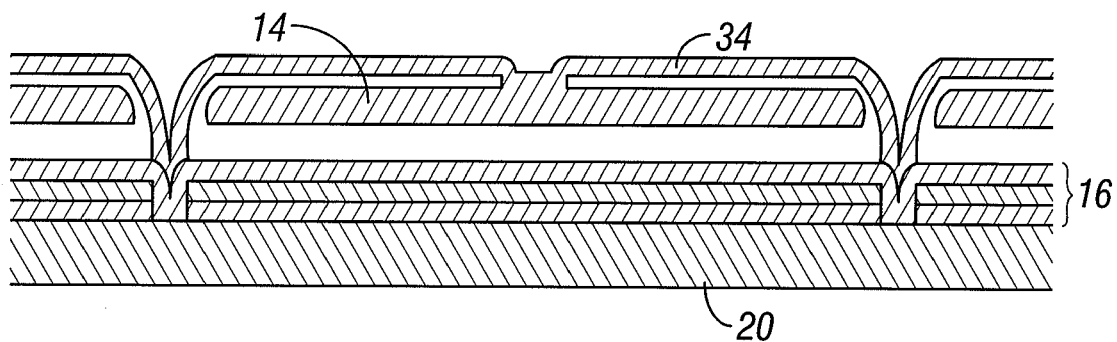
FIG. 7C is a cross section of another alternative embodiment of an interferometric modulator.
Figure 7D:
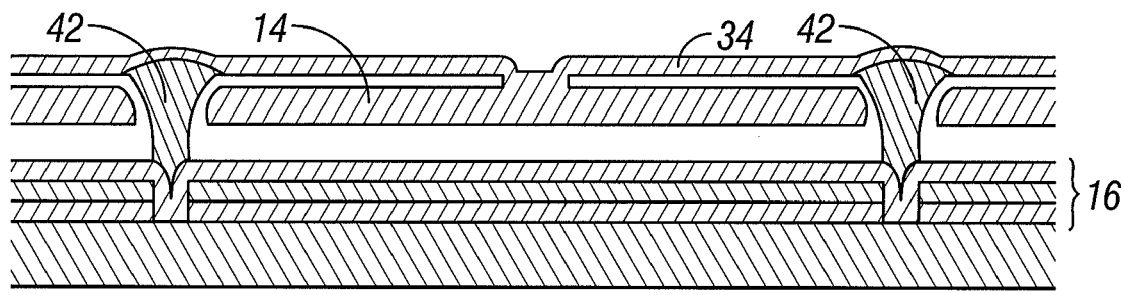
FIG. 7D is a cross section of yet another alternative embodiment of an interferometric modulator.
Figure 7E:
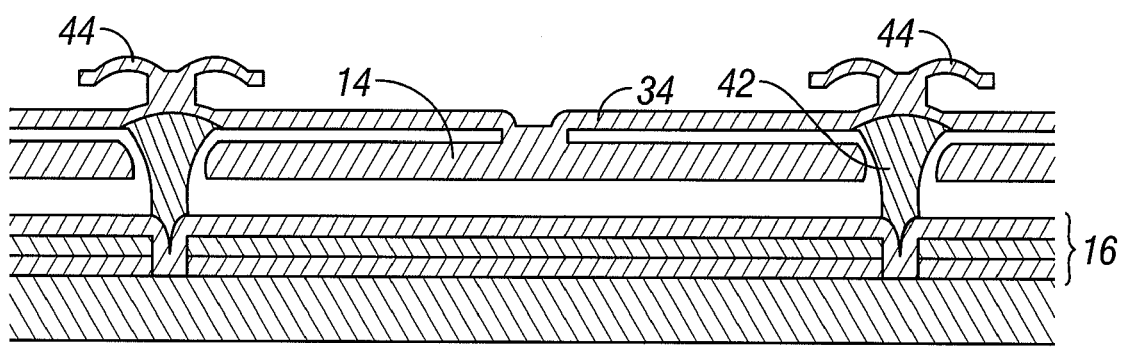
FIG. 7E is a cross section of an additional alternative embodiment of an interferometric modulator.

The details of the structure of interferometric modulators that operate in accordance with the principles set forth above may vary widely. For example, FIGS. 7A-7E illustrate five different embodiments of the movable reflective layer 14 and its supporting structures. FIG. 7A is a cross section of the embodiment of FIG. 1, where a strip of metal material 14 is deposited on orthogonally extending supports 18. In FIG. 7B, the moveable reflective layer 14 is attached to supports at the corners only, on tethers 32. In FIG. 7C, the moveable reflective layer 14 is suspended from a deformable layer 34, which may comprise a flexible metal. The deformable layer 34 connects, directly or indirectly, to the substrate 20 around the perimeter of the deformable layer 34. These connections are herein referred to as support posts. The embodiment illustrated in FIG. 7D has support post plugs 42 upon which the deformable layer 34 rests. The movable reflective layer 14 remains suspended over the cavity, as in FIGS. 7A-7C, but the deformable layer 34 does not form the support posts by filling holes between the deformable layer 34 and the optical stack 16. Rather, the support posts are formed of a planarization material, which is used to form support post plugs 42. The embodiment illustrated in FIG. 7E is based on the embodiment shown in FIG. 7D, but may also be adapted to work with any of the embodiments illustrated in FIGS. 7A-7C as well as additional embodiments not shown. In the embodiment shown in FIG. 7E, an extra layer of metal or other conductive material has been used to form a bus structure 44. This allows signal routing along the back of the interferometric modulators, eliminating a number of electrodes that may otherwise have had to be formed on the substrate 20.

In embodiments such as those shown in FIG. 7, the interferometric modulators function as direct-view devices, in which images are viewed from the front side of the transparent substrate 20, the side opposite to that upon which the modulator is arranged. In these embodiments, the reflective layer 14 optically shields the portions of the interferometric modulator on the side of the reflective layer opposite the substrate 20, including the deformable layer 34. This allows the shielded areas to be configured and operated upon without negatively affecting the image quality. Such shielding allows the bus structure 44 in FIG. 7E, which provides the ability to separate the optical properties of the modulator from the electromechanical properties of the modulator, such as addressing and the movements that result from that addressing. This separable modulator architecture allows the structural design and materials used for the electromechanical aspects and the optical aspects of the modulator to be selected and to function independently of each other. Moreover, the embodiments shown in FIGS. 7C-7E have additional benefits deriving from the decoupling of the optical properties of the reflective layer 14 from its mechanical properties, which are carried out by the deformable layer 34. This allows the structural design and materials used for the reflective layer 14 to be optimized with respect to the optical properties, and the structural design and materials used for the deformable layer 34 to be optimized with respect to desired mechanical properties.

The performance of MEMS devices in general and interferometric modulators in particular, may be adversely affected by a condition known in the art as stiction. With reference to FIG. 1, stiction can cause, for example, the actuated movable layer 14b to remain in contact with the optical stack 16b, even in the presence of a restoring force that would be expected to return the movable layer 14b to the non-actuated position. Stiction occurs when the total of several adhesion forces, arising from a various adhesion mechanisms, are greater than the restoring force. The restoring force comprises the combined mechanical tensile stresses in the actuated movable layer, and the support structures supporting the movable layer. Since surface forces become more significant with decreasing device dimensions, and restoring forces shrink with decreasing device dimensions, stiction can be a concern for MEMS devices including interferometric modulators.

Adhesion forces may arise from several mechanisms including, for example, capillary forces, van der Waals interactions, chemical bonds and trapped charges. Adhesion forces due to all of these mechanisms, in varying degrees, depend on the contact area and surface separation between the various movable and stationary layers when in the actuated state. Adhesion forces also depend on the environmental conditions, such as, for example moisture, of the area within and around the MEMS device.

Embodiments provide methods of testing MEMS devices to estimate the adhesion forces. By testing various configurations of surface roughness (e.g., bumps, dimples, grooves, etc.), the best configuration with regard to avoiding stiction can be identified. By testing various environmental condition, and/or materials introduced to effect the environment (e.g., desiccants, etc.), the most favorable conditions and/or materials may be identified. Other embodiments provide methods of testing MEMS devices to estimate the restoring forces provided by the combined mechanical stresses of the movable layer and support structures. By testing various configurations of movable layers and/or support structures (e.g., layer thickness, material rigidity, overlying or underlying support structures, support structure dimensions, etc.), the preferred mechanical configuration can be identified.

Figure 8:
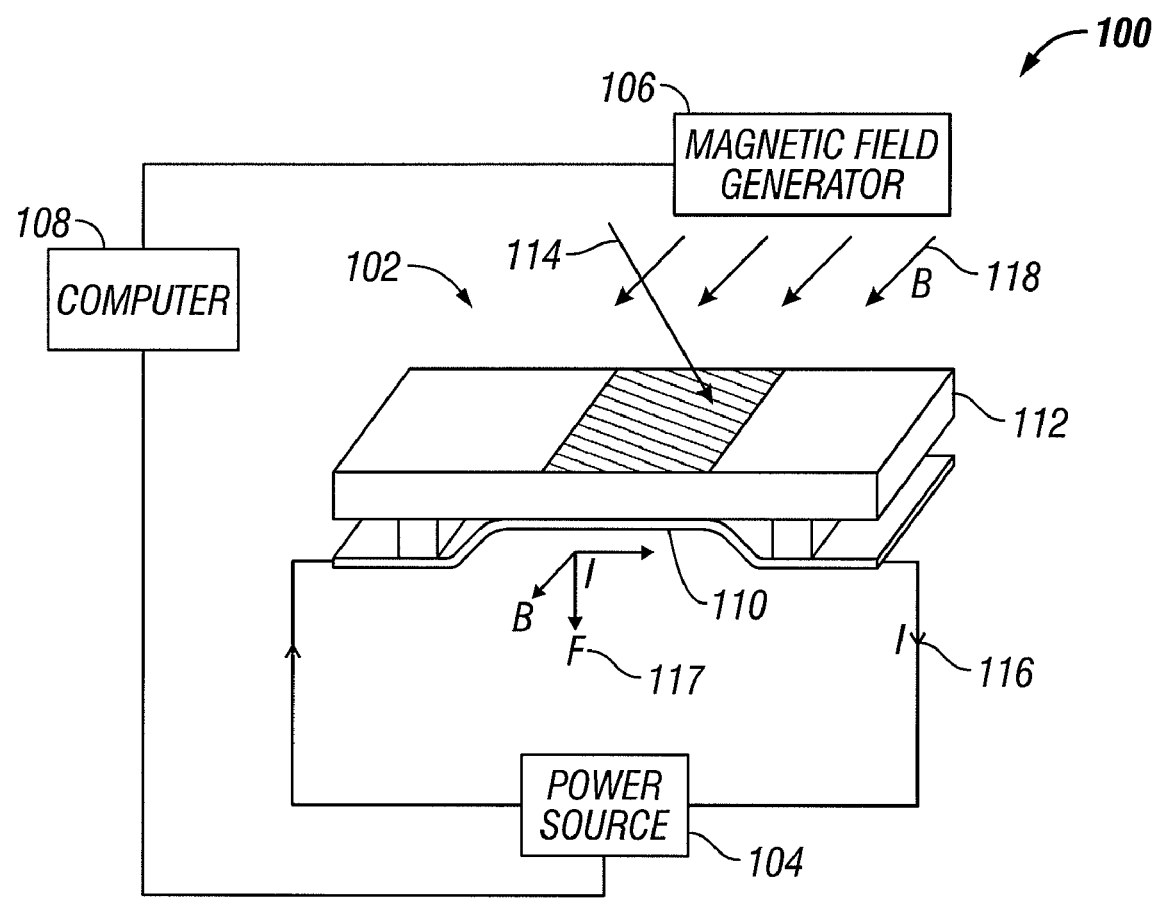
FIG. 8 schematically illustrates a system for testing a MEMS device.

FIG. 8 schematically illustrates a system for testing a MEMS device. In this embodiment, the system shown is being used for estimating the force required to move a MEMS device experiencing stiction where a movable element is adhered to another surface due to adhesion forces. The system 100 comprises an interferometric modulator 102, a power source 104, a magnetic field generator 106 and a computer 108. The interferometric modulator 102 is similar to the interferometric modulators 12a and 12b shown in FIG. 1. The interferometric modulator 102 is depicted to be stuck in the actuated state, with no voltages being applied to either electrode, where the movable reflective element 110 is adhered to the substrate 112. The movable reflective element 110 is adhered to the substrate 112 by adhesion forces that exceed the restoring forces of the movable reflective element 110. The interferometric modulator 102 is in a non-reflective state where incident light 114 is substantially completely non-reflected. In some embodiments, the incident light may be supplied by an illumination device, not shown.

The power source 104 is configured to apply an electrical current 116 to the electrode layer formed on the movable reflective element 110. The electrical current 116 can be a constant level or a waveform. Details of selecting the current level and/or waveform characteristics are discussed below in reference to FIGS. 10 and 11. In some embodiments, the current level is limited to a maximum value. It may be desirable to limit the current level in order to ensure that the interferometric modulator 102 is not damaged.

The magnetic field generator 106 is configured to apply a magnetic field 118 in the vicinity of the interferometric modulator 102. In some embodiments, at least a portion of the magnetic field 118 is perpendicular to the current 116 flowing through the electrode of the movable reflective element 110. In some embodiments, the magnetic field 118 is substantially entirely perpendicular to the current 116 flowing through the electrode of the movable element 110. In one embodiment the magnetic field 118 is fairly uniform. In another embodiment the magnetic field generator 106 comprises one or more pairs of Helmholtz coils configured to generate a fairly uniform magnetic field(s). The magnetic field 118 may be steady state (or static), or it may be a waveform. Details of selecting the magnetic field static level and/or waveform characteristics are discussed below in reference to FIGS. 10 and 11.

By applying an electrical current to the electrode of the movable reflective element 110 in the presence of a magnetic field, a force 117 known as the Lorentz force will act on the movable reflective element. The Lorentz force 117 is caused by a charge moving perpendicular to a magnetic field. The direction of the Lorentz force is perpendicular to both the current flow direction and the direction of the portion of the magnetic field that is perpendicular to the current flow. The direction of the Lorentz force obeys the "right hand rule" as depicted by the axes labeled B, I and F in FIG. 8. By choosing the direction of the current 116 and magnetic field 118 properly, the Lorentz force 117 will be in a direction pulling against the adhesion forces causing the stiction. Details of estimating the magnitude of the Lorentz force 117 are presented below in reference to FIG. 12.

The computer 108 can be used to control the electrical current 116 supplied by the power source 104 and/or the magnetic field 118 supplied by the magnetic field generator 106. In some embodiments, the computer 108 is configured to record the levels of the current 116 and/or the magnetic field 118. The computer 108 may record the level of the current 116 and/or the magnetic field 118 when an adhered movable element 110 is detected to have moved. The computer 108 may record the level of the current 116 and/or the magnetic field 118 when a movable element in a first state a first distance from a substrate is detected to have moved to a second state a second distance from the substrate. In this case, the computer 108 may also record the distance that the movable element moved when going from the first state to the second state. Detection of movement of the movable element 110 can be performed using optical systems and techniques including direct observation by a user. Detection of the movement can also be automated using an optical detector. Details of detecting movement of a movable reflective layer in an interferometric modulator are discussed below in reference to FIGS. 13 and 14.

While the embodiment shown in FIG. 8 illustrates using the system 100 for inducing movement of a movable element that is adhered to another surface, other uses are within scope. In other embodiments, the system 100 may be used to estimate the force required to move a movable layer of a MEMS device when the movable element is in the relaxed state. In these embodiments, a spring constant (or other measure of the stiffness of the movable element) can be estimated. In some embodiments, the distance that the movable element moves is estimated. The distance that the movable element moves can be determined by optical means. When testing optical MEMS, such as interferometric modulators, the distance that the movable reflective layer moves can be measured by detecting the change in reflectance of the interferometric modulator. Details on methods and systems for measuring reflectance are discussed below in reference to FIGS. 13 and 14.

Figure 9:
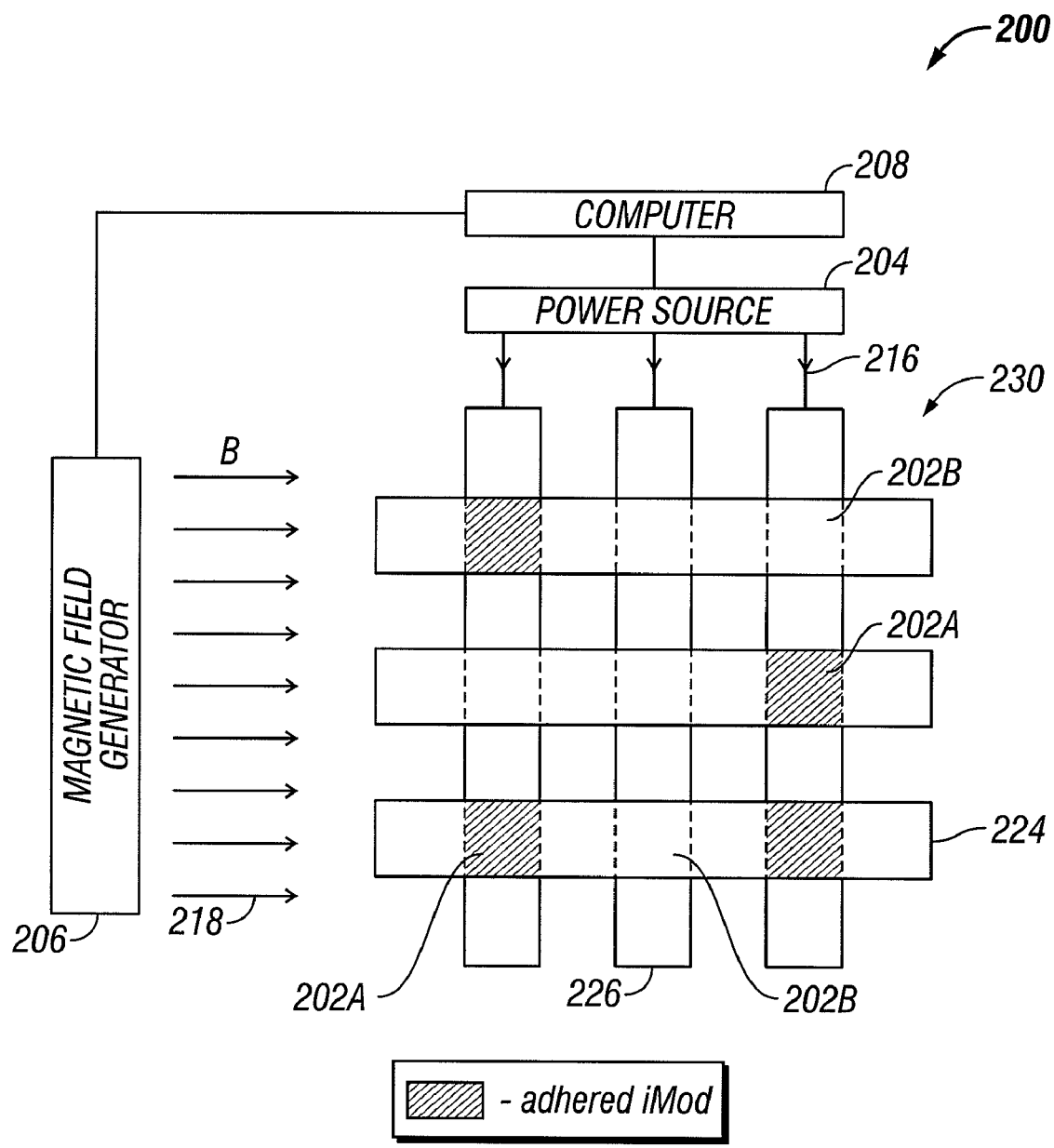
FIG. 9 schematically illustrates a system for testing an array of interferometric modulators.

While the system 100 in FIG. 8 is shown testing a single MEMS device, testing of multiple MEMS devices, even arrays of MEMS devices is within scope. For example, FIG. 9 schematically illustrates a system for testing an array of interferometric modulators. The system 200 comprises an array 230 of interferometric modulators 202A and 202B (collectively referred to with reference numeral 202), a power source 204, a magnetic field generator 206, and a computer 208. The interferometric modulators 202A and 202B are similar to the interferometric modulators 12a and 12b shown in FIG. 1. The interferometric modulators 202 are located at intersections of row electrodes 224 and column electrodes 226. The interferometric modulators 202A are stuck in the actuated state, with no voltages being applied to either electrode, where the movable reflective element is adhered to the substrate. The movable reflective element may be adhered to the substrate by adhesion forces that exceed the restoring forces of the movable reflective element. In this example, the movable reflective element includes one of the column electrodes 226. The interferometric modulators 202B are in the normal relaxed state separated from the substrate. The interferometric modulators 202A are in a non-reflective state where incident light is substantially non-reflected, while interferometric modulators 202B are in a reflective state (e.g., reflecting a color such as red, green and/or blue).

The power source 204 is configured to apply an electrical current 216 to the column electrodes 226 formed on the movable reflective element. The electrical current 216 makes a complete loop returning back to the power source 204 after flowing through the electrode. This return loop is not shown in FIG. 9. The electrical current 216 can be a constant amplitude signal and/or a waveform. Details of selecting the current level and/or waveform characteristics are discussed below in reference to FIGS. 10 and 11. In some embodiments, the current level is limited to a maximum value. It may be desirable to limit the current level in order to ensure that the interferometric modulators 202 are not damaged.

The magnetic field generator 206 is configured to apply a magnetic field 218 in the vicinity of the interferometric modulators 102 in the array 230. In some embodiments, at least a portion of the magnetic field 218 is perpendicular to the current 216 flowing through the column electrodes 226. In some embodiments, the magnetic field 218 is substantially entirely perpendicular to the current 216 flowing through the column electrodes 226. In one embodiment, the magnetic field 218 is fairly uniform. In some embodiments, the magnetic field generator 206 comprises commercially available electromagnets (e.g., available from Lakeshore Cryotronics, Inc. of Westerville, Ohio) that produce a fairly uniform magnetic field. Superconducting magnets and some permanent magnets may also be used. Further more, in another embodiment, the magnetic field generator 206 comprises one or more pairs of Helmholtz coils configured to generate a fairly uniform magnetic field(s). However, Helmholtz coils are only one example and may not be a practical solution, requiring significant amounts of metal loops, depending on the magnetic field level required. The magnetic field 218 may be steady state (i.e. static), or it may be a waveform. Details of selecting the magnetic field static level and/or waveform characteristics are discussed below in reference to FIGS. 10 and 11.

The computer 208 can be used to control the electrical current supplied by the power source 204 and/or the magnetic field 218supplied by the magnetic field generator 206. The computer 208, controls the current 216 and the magnetic field 218 output by the power source 204 and the magnetic field generator 206, respectively. The computer 208 can be programmed to control the power source 204 such that it will produce any arbitrary value of current 216 (within its limits) as a function of time. The computer 208 can also be programmed to control the power supply of the magnet (magnetic field generator) 206 such that it will produce any arbitrary value of magnetic field (within its limits) as a function of time.

In some embodiments, the computer 208 is configured to record the levels of the current 216 and/or the magnetic field 218. The computer 208 may record the level of the current 216 and/or the magnetic field 218 when one of the adhered movable elements of the interferometric modulators 202A is detected to have moved. The computer may record the level of the current 216 and/or the magnetic field 218 when a movable element in a first state a first distance from a substrate is detected to have moved to a second state a second distance from the substrate. In this case, the computer 208 may also record the distance that the movable element moved when going from the first state to the second state. Detection of movement of the movable element 110 can be performed using optical techniques including direct observation by a user. Detection of the movement can also be automated using an optical detector. Details of detecting movement of a movable reflective layer in an interferometric modulator are discussed below in reference to FIGS. 13 and 14.

Figure 10A:
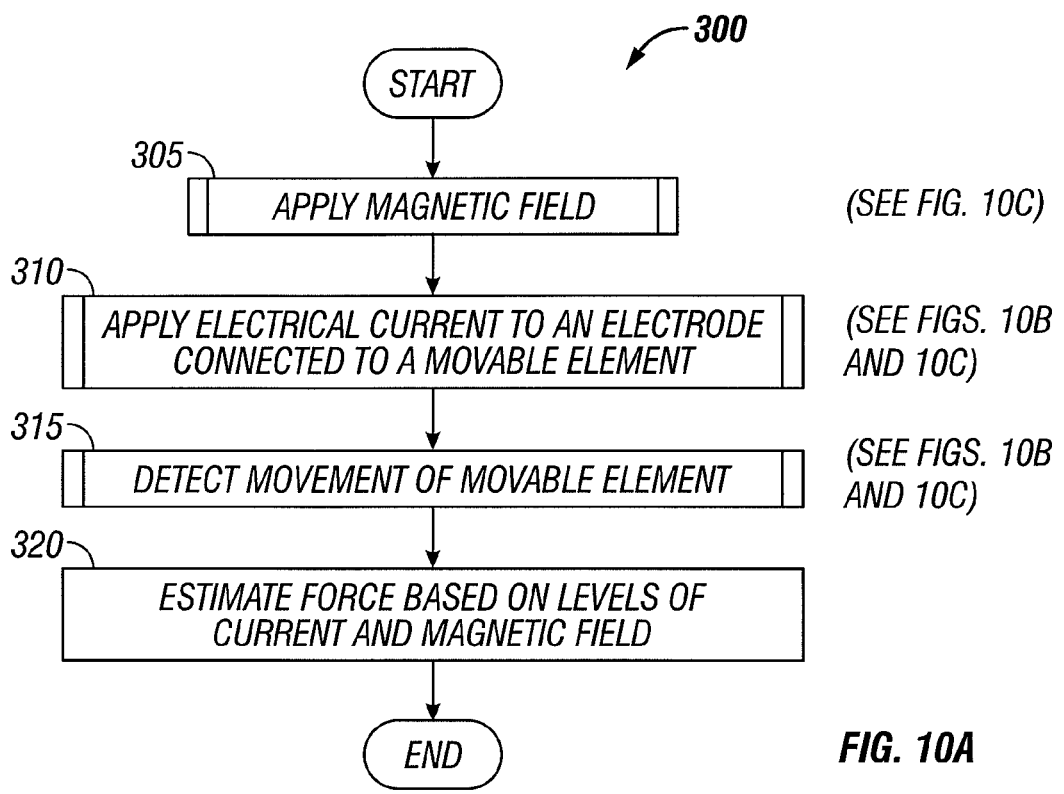
FIG. 10A is a flowchart illustrating a process for testing MEMS devices.

FIG. 10A is a flowchart illustrating a process for testing MEMS devices. Depending on the embodiment, additional blocks may be added, others removed, and the ordering of the blocks rearranged. Furthermore, selected blocks may be merged together and/or split into several steps. The process 300 starts at block 305 with a magnetic field being applied in the vicinity of a MEMS device (e.g., the interferometric modulator 102 of FIG. 8, or the array 230 of FIG. 9). While the magnetic fields 118 and 218 of FIGS. 8 and 9 were depicted as being substantially completely perpendicular to the currents 116 and 216, respectively, other relative directions may also be used. As long as a portion of the magnetic field is in the plane of the movable element 110 in the interferometric modulator 102 (or a plane parallel to the substrate 112 or the plane of the array 230) and a portion is perpendicular to the current, a force will be generated on the movable element 110. In some embodiments, the applied magnetic field is a steady state or constant amplitude. In other embodiments, the applied magnetic field is a waveform (e.g., pulses). Preferably the magnetic field applied at block 305 is fairly uniform. Preferably the magnetic field generator used to apply the magnetic field at block 305 comprises one or more pairs of Helmholtz coils configured to generate a fairly uniform magnetic field(s).

While the magnetic field is being applied to the MEMS device, the process 300 continues at block 310 where an electrical current is applied to an electrode connected to a movable element of the MEMS device. The directions of the current and the magnetic field are chosen such that the force generated on the movable element by the combined effect of the current and the magnetic field is in a desired direction (e.g., a direction to move an adhered movable element away from a surface it is adhered to). As discussed above, the applied electrical current can be a steady state or static level and/or a waveform. Preferably the duration and/or magnitude of the electrical current is chosen in combination with the applied magnetic field such that the MEMS device is not damaged due to the applied force or current level.

While the magnetic field and electrical currents are being applied simultaneously, the process 300 continues at block 315 where movement of the movable element of the MEMS device is detected. Detection may be made by observing the position of the movable element. The position of the movable element may be detected by a user observing the change of state or by an optical detector. Movement may be detected and the distance moved estimated by measuring the change in reflectance of incident light of an interferometric modulator. Apparatus for measuring reflectance are discussed below in reference to FIGS. 13 and 14.

When a movement of the movable element has been detected at block 315, the process 300 continues at block 320 where an estimate of the force required to move the moveable element is made. The force can be estimated based on the levels of the applied electrical current and magnetic field. In some embodiments, the estimated force may be the force required to move a movable element a certain distance. In these embodiments, an estimate of a spring constant of the integrated support structure can be made based on the estimated force and the measured distance that the movable element moves. In some embodiments, the force estimated is the force required to move a movable element that is adhered to another surface of the MEMS device. In these embodiments, knowledge of the spring constant of the support structure and the distance that the movable element was displaced while in the adhered state can be used to estimate the adhesion force holding the movable element in the adhered state. Details of methods of estimating these forces are discussed below in reference to FIG. 12.

Figure 10B:
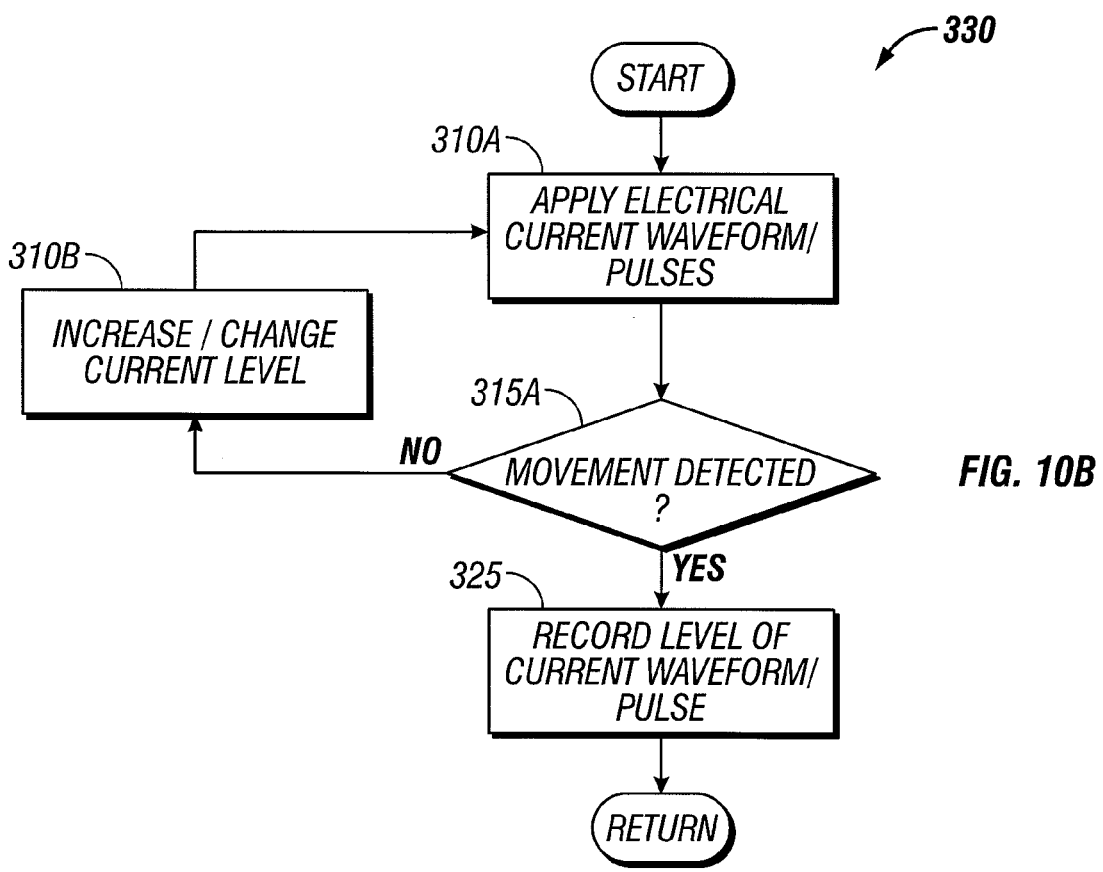
FIG. 10B is a flowchart illustrating certain alternative steps that may be used in the process of FIG. 10A.
Figure 11:
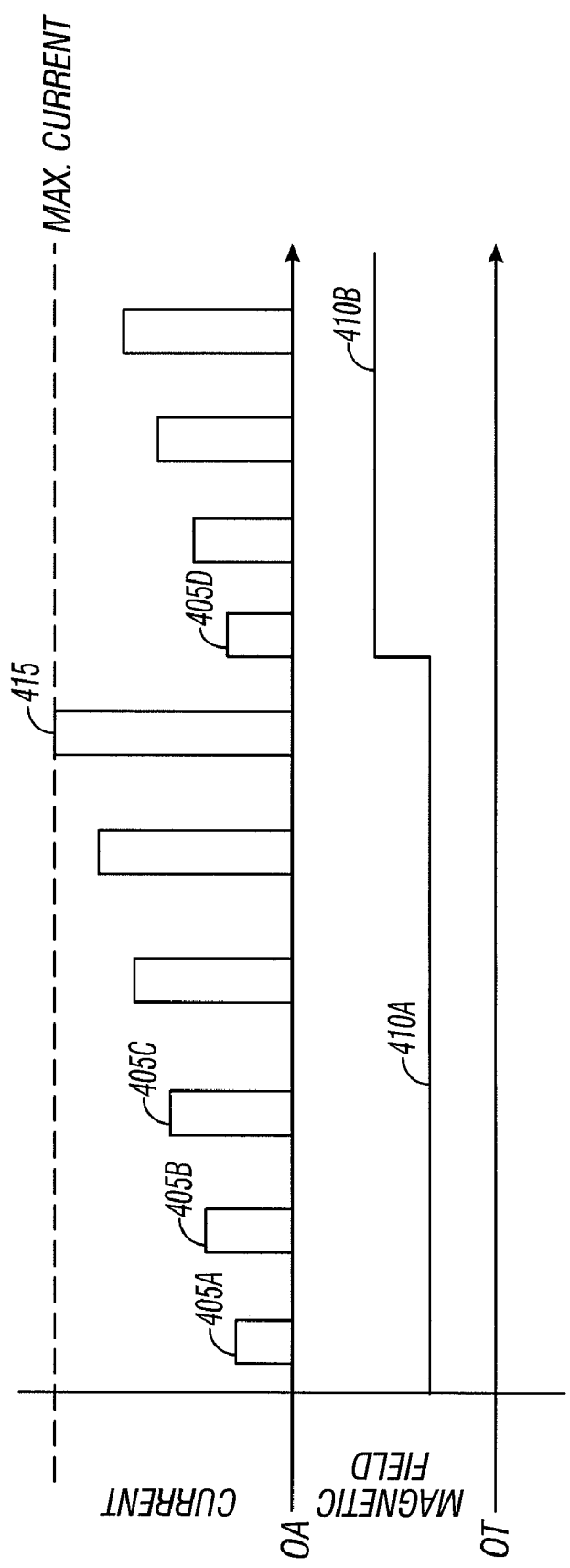
FIG. 11 depicts a series of waveforms that may be applied to MEMS devices using the methods of FIGS. 10A, 10B and 10C.

FIG. 10B is a flowchart illustrating certain alternative steps that may be used in the process 300 of FIG. 10A. The process 330 comprises an exemplary process for performing the functions of blocks 310 and 315 where the electrical current is applied (310) and the movement is detected (315). The process 330 starts at block 310A where an electrical current wave form is applied to the electrode of the movable element of the MEMS device being tested while the magnetic field (see block 305 in FIG. 10A) is also being applied. FIG. 11 depicts a series of waveforms that may be applied to MEMS devices in this process. In the example shown in FIG. 11, a first electrical pulse 405A, of a first amplitude, is applied to the electrode while a steady state magnetic field at an amplitude 410A is also applied. In some embodiments a power source such as the currents sources 104 and 204 of FIGS. 8 and 9, respectively, can generate the waveforms directly. In other embodiments, a computer such as the computer 208 may be interfaced with the power source 204 (or the magnetic field generator 206) to generate the waveforms.

A determination is made at decision block 315A as to whether or not movement of the movable element was detected. If no movement of the movable element was detected, the process proceeds to block 310B, where a new electrical current level can be selected by a controlling computer (e.g., the computers 108 or 208 in FIGS. 8 and 9, respectively). Generally, the level of the current selected at block 310B will be an increased level if no movement was detected, but the current level can be selected on a random or quasi-random basis as well. In the example of FIG. 11, the new current level is depicted as pulse 405B with a larger amplitude than the pulse 405A. After selecting the new current level, the process 330 continues back to block 310A, where the newly selected current waveform 405B is applied to the electrode of the movable element. The controlling computer can control a power source to apply the selected waveform. If movement is still not detected at decision block 315A, then the current level can be selected to be a larger amplitude such as pulse 405C in FIG. 11. This increasing of the current waveform pulse level can continue until the movable element is detected to move at block 315A. When movement is detected at decision block 315A, the process 330 continues to block 325, where the level of the current waveform pulse that resulted in movement is recorded. Returning to the process 300 in FIG. 10A, the recorded current waveform pulse level can be used along with the magnetic field level to estimate the force required to move the movable element at block 320.

The method depicted in FIG. 10B can be used in any of the embodiments discussed above. In some embodiments, the movable element is adhered to a surface of the MEMS device and movement results when the adhesion forces are exceeded. In other embodiments, the movable element is not adhered to another surface and the forces calculated can be used to estimate the restorative stiffness of the support structures and movable elements.

While the current waveform depicted in FIG. 11 shows rectangular pulses as examples only, pulses of any shape can be used. Preferably the duration and amplitude of the current pulse is chosen so as not to damage the electrode and/or the movable element. The time between current pulses may be made long enough to allow cooling of the electrodes to avoid overheating and degradation of the material properties of deformable layers. Support structures such as oxide posts may act as heat sinks drawing heat away from the electrodes and/or deformable layers.

Figure 10C:
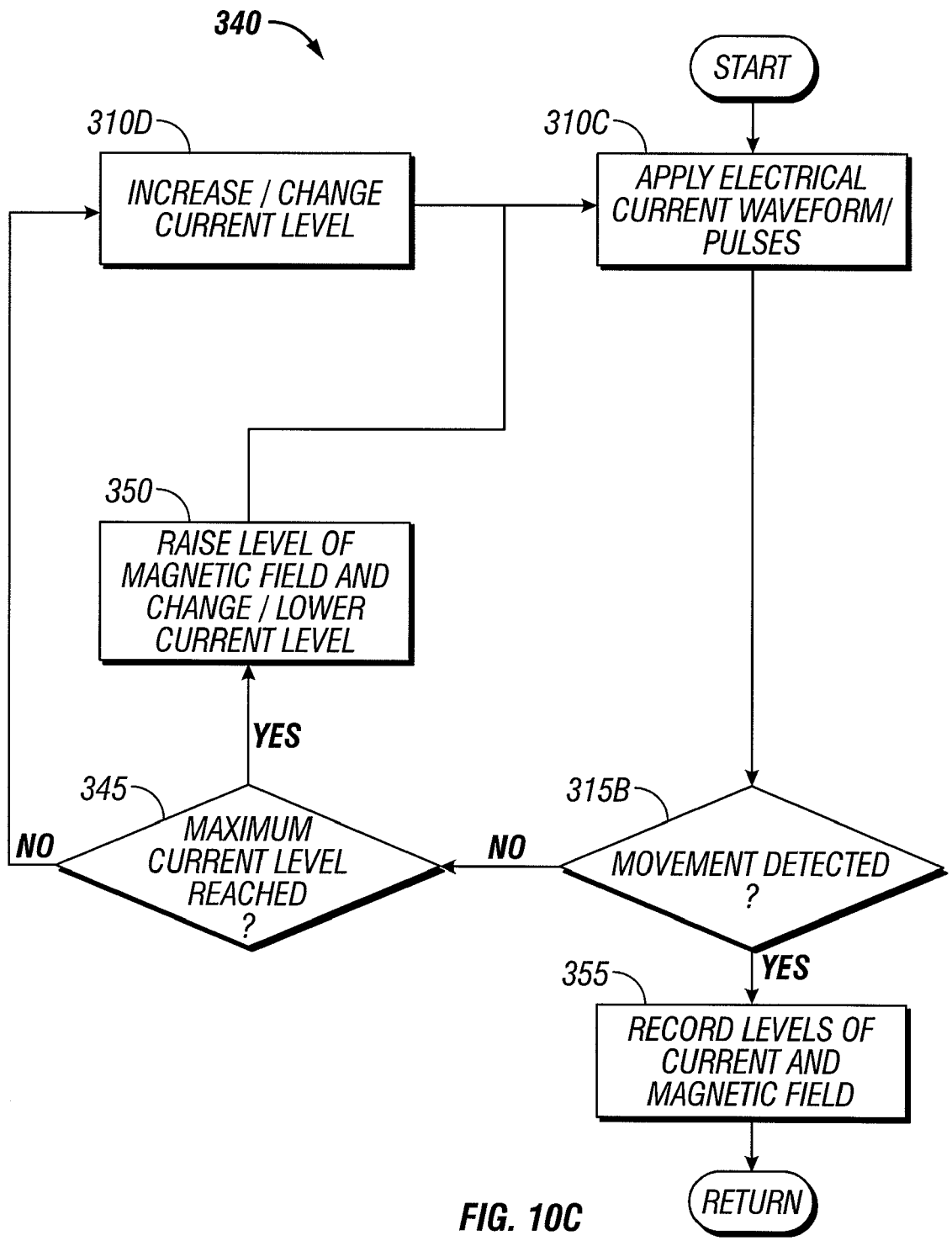
FIG. 10C is a flowchart illustrating certain alternative steps that may be used in the process of FIG. 10A.

FIG. 10C is a flowchart illustrating certain alternative steps that may be used in the process 300 of FIG. 10A. The process 340 comprises another exemplary process for performing the functions of blocks 305, 310 and 315 where the magnetic field is applied (305), the electrical current is applied (310) and the movement is detected (315). As in the process 330 discussed above, the process 340 illustrates a method of gradually increasing an applied current level until a movement of a movable element is detected. However, the process 340 differs from the process 330 in that the current level is allowed only to be increased to a maximum level, at which point the magnetic field is increased.

The process 340 starts at block 310C where an electrical current wave form is applied to the electrode of the movable element of the MEMS device being tested while the magnetic field (see block 305 in FIG. 10A) is also being applied. In the example waveforms shown in FIG. 11, a first electrical pulse 405, of a first amplitude, is applied to the electrode while a steady state magnetic field at a level 410A (see FIG. 11) is also applied. In some embodiments a power source such as the currents sources 104 and 204 of FIGS. 8 and 9, respectively, can generate the waveforms directly. In other embodiments, a computer such as the computer 208 may be interfaced with the power source 204 (or the magnetic field generator 206) to generate the waveforms.

A determination is made at decision block 315B as to whether or not movement of the movable element was detected. If no movement of the movable element was detected, the process proceeds to decision block 345, where the applied current level is compared to a maximum allowable level. Referring to FIG. 11, if the current level has reached a maximum level 415, then the process proceeds to block 350, where the controlling computer selects to raise the level of the magnetic to a level 410B, and selects to lower the electrical current waveform to a lower amplitude such as pulse 405D. The process 340 then returns to block 310C where the newly selected current waveform and magnetic field amplitude (not shown) are applied.

Returning to block 345, if the maximum allowable current level has not been reached, then the process 340 continues to block 310D where a new electrical current level can be selected by the controlling computer (e.g., the computers 108 or 208 in FIGS. 8 and 9, respectively) as discussed above in reference to block 310B of FIG. 10B. Generally, the level of the current selected at block 310D will be an increased level if no movement has been detected, but the current level can be selected on a random or quasi-random basis as well. The process 340 can continue to raise the current level at block 310D, and to raise the magnetic field level while lowering the electrical current level at block 350, until movement is detected at decision block 315B. When movement is detected at decision block 315B, the process 340 continues to block 355, where the levels of the current waveform pulse and the magnetic field that resulted in movement are recorded. Returning to the process 300 in FIG. 10A, the recorded current waveform pulse and magnetic field level can be used to estimate the force required to move the movable element at block 320.

The method depicted in FIG. 10C can be used in any of the embodiments discussed above. In some embodiments, the movable element is adhered to a surface of the MEMS device and movement results when the adhesion forces are exceeded. In other embodiments, the movable element is not adhered to another surface and the forces calculated can be used to estimate the restorative stiffness of the support structures and movable elements.

Whereas the current waveform depicted in FIG. 11 shows rectangular pulses as examples only, pulses of any shape can be used. Preferably the duration and current level of the current pulse is chosen so as not to damage the electrode and/or the movable element. Preferable the time between current pulses is long enough to allow cooling of the electrodes to avoid overheating and degradation of the material properties of deformable layers. Support structures such as oxide posts may act as heat sinks drawing heat away from the electrodes and/or deformable layers.

Although the examples shown in FIGS. 10B and 10C use short duration pulses with differing amplitudes for the current and steady state amplitudes for the magnetic field, short duration magnetic field pulses of differing amplitudes can be used with a low level steady state current. Preferably the current levels are low enough to avoid damaging the electrode and/or the movable element.

In some embodiments, the processes 300, 330 and 340 may include additional blocks and the blocks may be rearranged from the illustrations of FIGS. 10A, 10B and 10C.

Figure 12:
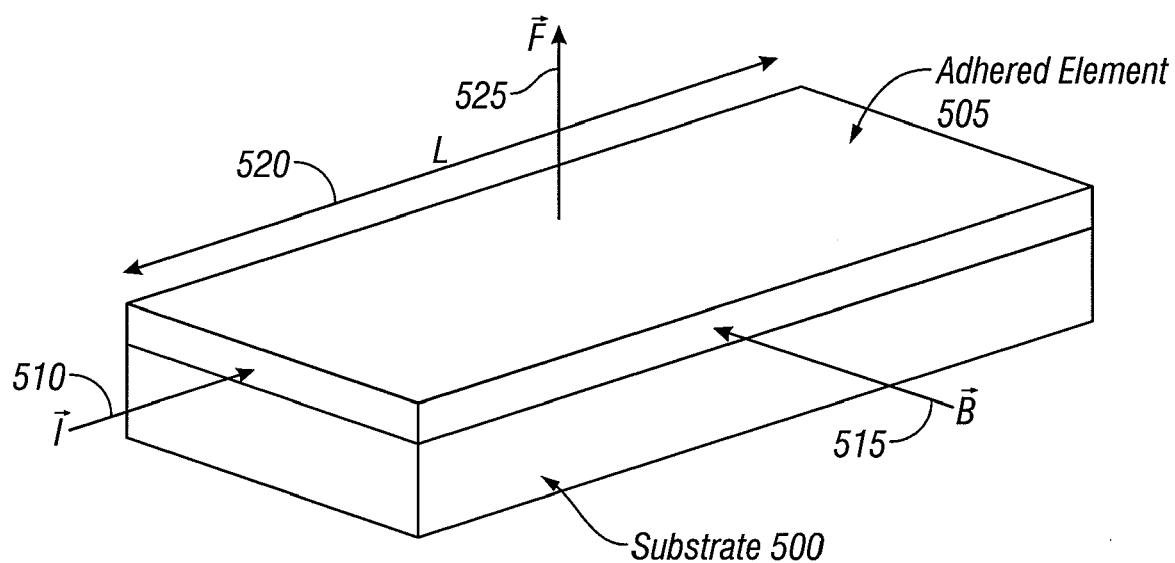
FIG. 12 is an illustration of a geometric model used to estimate a force generated on a movable element containing a current in the presence of a magnetic field.

FIG. 12 is an illustration of a geometric model used to estimate a force generated on a movable element containing a current flow in the presence of a magnetic field. The example in FIG. 12 illustrates a movable element 505 that is adhered to a substrate 500. In this situation, an adhesion force $F_{adh}$ is acting on the movable element 505 and preventing a restorative force $F_{res}$, caused by stresses induced by displacing/deforming the support structures and movable element, from returning the movable element to the relaxed state. If it is assumed that the integrated support structures/movable element can be represented by a linear spring with a spring constant "k", and the displacement from the relaxed position is given by "x", the adhesion force can be represented by the following equation:

$$F_{res} = kx \quad (1)$$

The adhesion force $F_{adh}$ is greater than the restorative force $F_{res}$. Therefore, in order to move the movable element, a force applied to the movable element needs to exceed the difference between $F_{res}$ and $F_{adh}$. The force being used to make up this difference, known as the Lorentz force, is supplied by applying a current 510 to the conductive movable element 505 in the presence of a magnetic field 515. The Lorentz force is given by the following vector cross product:

$$\vec{F} = \vec{I}L \times \vec{B} \quad (2)$$

where L is the length of the movable element 505. The Lorentz force is perpendicular to both the current 510 and the magnetic field 515. Thus, if the magnetic field 515 is perpendicular to the current 510, and parallel to the substrate 500, then the Lorentz force 525 is perpendicular to the substrate 500 and is most effective in countering the adhesion force. For ease of explanation and without loss of generality, it will be assumed from herein that the magnetic field 515 is perpendicular to the current 510 and parallel to the substrate 500, as depicted in FIG. 12, and the Lorentz force relationship in Equation 2 can be simplified to the following:

$$F = ILB \quad (3)$$

When the combination of the Lorentz force and the restorative force just exceed the adhesion force, the movable element 505 will return to the relaxed state. Thus, when movement is detected at block 315 of the process 300 in FIG. 10A, the adhesion force can be estimated by the following equation:

$$F_{adh} = ILB + kx \quad (4)$$

where I is the magnitude of the applied current 510, B is the magnitude of the applied magnetic field 515, L is the length 520 of the movable element, and kx is the restorative force given in Equation 1.

Therefore, Equation 4 can be used to estimate the adhesion force preventing a movable element from returning to the relaxed state. Estimating the adhesion force in this way can be useful for testing multiple configurations of MEMS devices. Surface textures can be varied in multiple MEMS devices and those with the lowest estimated adhesion forces may be preferred. Environmental conditions during manufacture may also be varied and, again, those resulting in the lowest estimated adhesion forces may be preferred. Other kinds of design variations known to those of skill in the art may also be evaluated by estimating the adhesion forces in this way.

In addition to estimating adhesion forces of adhered movable elements, some embodiments can estimate the restorative spring constant "k" afforded by the integrated structures of a MEMS device. In these embodiments, a measurement of the amount of displacement "x" of a movable element due to an applied current I and an applied magnetic field B can be used to estimate the spring constant "k" by the following equation:

$$k = \frac{ILB}{x} \quad (5)$$

In some embodiments, the measurement of the displacement "x" can be accomplished using optical means or other means such as Atomic Force Microscopy, or electrical means such as measurement of the capacitance. In other embodiments, e.g., in reflective devices such as interferometric modulators, the displacement may be estimated indirectly by measuring the change in reflectance of incident light. Apparatus for measuring reflectance are presented below in relation to FIGS. 13 and 14.

By testing various configurations of support structures including various layer thicknesses, structural dimension differences, material differences, etc., preferred designs may be identified by calculating the restorative spring constants as described above. For example, if it is desirable to avoid stiction, then configurations resulting in higher spring constants may be preferred. If lower actuation voltages are desired, then lower spring constants may be preferred. In other cases, a range of spring constants may be identified. Other testing objectives will be apparent to those of skill in the art.

Due to the small dimensions of many MEMS devices, the various electrodes and movable elements may be susceptible to damage by the applied electrical currents of the various embodiments discussed above. For this reason, care should be taken in choosing the levels of current and/or magnetic field used to induce movement of the movable elements. An example of such damage-controlling test design will now be discussed in reference to a test for estimating the stiffness of a support structure.

The example test comprises applying a current to the movable element of a MEMS device in the relaxed state and inducing a displacement of the movable element up to the height of the air gap between the movable element and the substrate. As discussed above, this type of test can be used to estimate the restorative stiffness of various support structures. In order to displace a movable element having a spring constant "k" over a distance "x", a Lorentz force F given by the following equation needs to be generated:

$$F = ILB = kx \quad (6)$$

Or:

$$IB = \frac{kx}{L} \quad (7)$$

In one embodiment, a steady state magnetic field B is applied and a short duration electrical current pulse I is applied. The level of the magnetic field needed depends on the maximum allowable electrical current level and duration of pulse that will not damage the MEMS device. Such levels and duration can be identified without undue testing and depend, at least in part, on the dimensions of the various structures of the MEMS device.

An interferometric modulator array will be used in this example illustrating how to design safe levels for the magnetic field and the electrical current. A typical interferometric modulator can be represented by the following characteristics:

Spring constant: k=100 N/m
Maximum displacement (air gap height): x=1800 Å
Movable element electrode length: L=30 μm These characteristics, when substituted into Equation 7, result in the following interrelationship between electrical current I and magnetic field B:

$$IB=(0.6) A\text{-Tesla} \quad (8)$$

For a currrent I=300 mA, a magnetic field B=2 Tesla is needed to achieve the full displacement of 1800 Å. This amount of current may melt the column electrode of an interferometric modulator. To do the experiment without damaging the interferometric modulator, one can either keep the magnetic field constant and pulse the current to high value for a short amount of time, or keep a very small current and pulse the magnetic field to high values for a short time. In one example, the current is flowing through a column electrode of an interferometric modulator array as shown in FIG. 9. The amount of power P generated per unit time when a current I(t) is passed through an entire column is given by the following equation:

$$P = I^2(t)R \quad (9)$$

where R is the resistance of the entire column. This applied power heats up the entire column. The rate of temperature change of the column can be represented by the following equation:

$$P = I^2(t)R = mC\frac{dT}{dt} \quad (10)$$

where T is temperature, t is time, m is the mass of the column electrode and C is the heat capacity of the electrode material. Solving Equation 10 for the change in temperature ΔT over time while a current waveform I(t) is applied over a time Δt results in the following:

$$\Delta T = \frac{R}{mC}\int_0^{\Delta t} I^2(t)\,dt \quad (11)$$

Equation 11 is valid only if it assumed that no heat is dissipated into other structures of the interferometric modulator (e.g., posts, etc.). This is not a valid assumption, but it is a worse case scenario and can be used as a safe estimate. In designing the allowable time for a given current waveform I(t), a tolerable temperature change can be used. In this example, a temperature change of 25° C. of the column is used as a tolerable level in this example. Setting ΔT=25° C. in Equation 11, assuming a rectangular pulse of amplitude $I_h$ and pulse duration Δt, and solving for the pulse duration Δt gives:

$$\Delta T = \frac{R}{mC}\int_0^{\Delta t} I^2(t)\,dt \leq 25 \quad (12A)$$

$$\frac{R}{mC}\Delta t I_h^2 \leq 25 \quad (12B)$$

$$\Delta t \leq \frac{25mC}{RI_h^2} \quad (12C)$$

If nickel is used for the electrode material in the interferometric modulator of this example, the following variables are representative:

R=1000 Ω
m=pV=p*Col. Width*Col. Length*Col Thickness
    m=(8908 kg/m3)(30 μm)(25 mm)(1400 Å)=9.35×10$^{-10}$ kg.
C=444 J/kg.K
Ih=300 mA=0.3 A Using these values, Equation 12C gives a pulse width of Δt=~0.1 μs Since this pulse width is easily achievable with standard power sources, it may be used in conjunction with a magnetic field of 2 Tesla to displace the example interferometric modulator the full 1800 Å. It should be noted that the dynamic response of the movable reflective layer also needs to be considered when choosing the pulse width. Those of skill in the art will be able to arrive at acceptable levels of current pulse amplitude and duration, and magnetic field strength without undo experimentation.

The example used to design the current waveform amplitude and duration, and the magnetic field level assumed a constant amplitude magnetic field and a short duration relatively high amplitude electronic pulse waveform. Other embodiments can use a low amplitude current with a short duration magnetic field pulse to obtain similar results. In addition, pulses comprising shapes other than the rectangular pulses of the example may also be used.

The example above was used to measure a support structure stiffness, k. However, the actuation voltage of a MEMS device can also be used as an indication of the spring constant. Thus, it may not be necessary to perform the above tests in order to estimate a stiction force. For example, if a movable element being tested is being actuated repeatedly without sticking, and then it sticks, the actuation test can be stopped and the stuck movable element can be tested using the systems of FIGS. 8, 9 and 10 to estimate the stiction force. Knowing the normal actuation voltage, an estimate of the stiffness, k, can be made and equation (4) above can be used to estimate the stiction force for a given applied current I, and magnetic field B that un-sticks (results in movement of) the stuck movable element.

As discussed above in reference to FIGS. 8, 9 and 10, some embodiments provide methods of detecting motion of a movable element that is in a relaxed or at least non-adhered position. In these embodiment, the measure of the displacement of the movable element can be used to estimate the structural stiffness (e.g., a spring constant) of the integrated posts and movable elements. A preferred way of measuring the distance the movable reflective element moves in an interferometric modulator, or other reflective MEMS device, is to measure the change in reflectance. Those of skill in the art can readily relate a change in reflectance to a displacement of one reflective element relative to another, at least partially reflective, element. Therefore, the details relating relative displacement versus measured reflectance will not be discussed.

Figure 13:
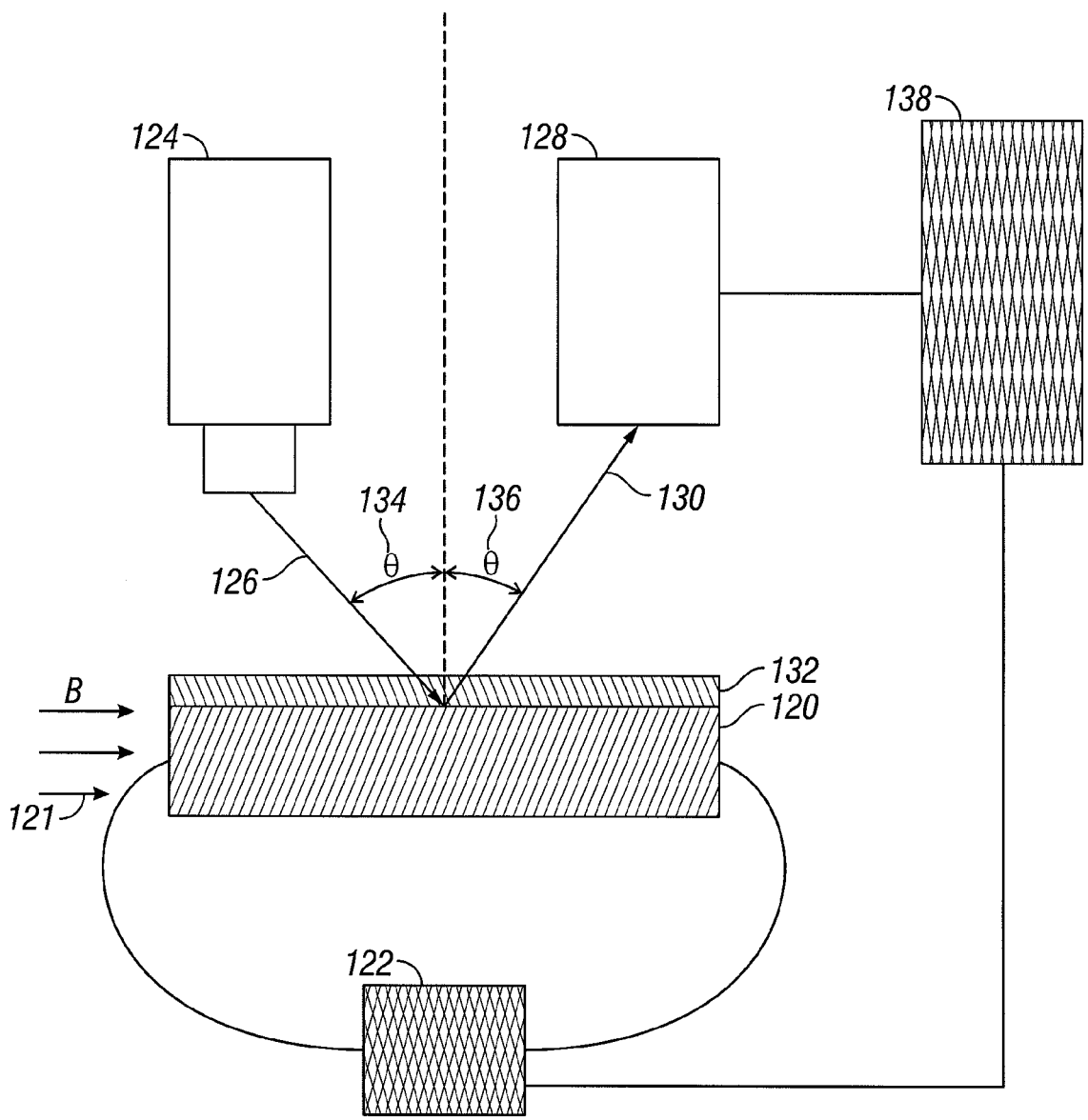
FIG. 13 is a schematic illustrating a system for determining reflectance of MEMS interferometric modulators.
Figure 14:
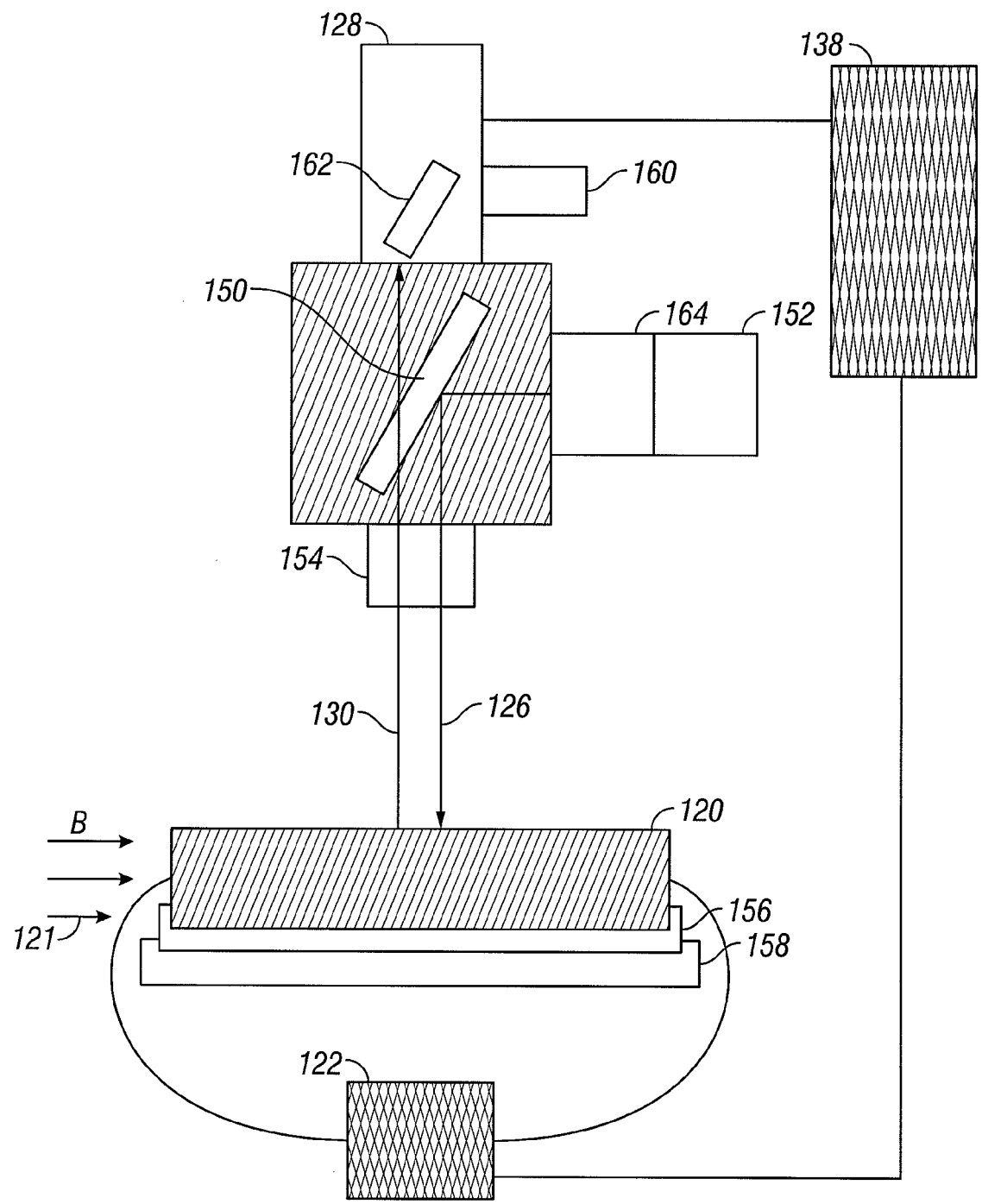
FIG. 14 is a schematic illustrating another embodiment for determining reflectance of MEMS interferometric modulators.

One embodiment of an apparatus suitable for measuring the reflectivity of an array of interferometric modulators using an automated detection system is depicted in FIG. 13. An array 120 that includes a plurality of interferometric modulators, for example, similar to the interferometric modulators illustrated in FIGS. 1 and 8, is electrically connected to a power source 122. The array is also in the presence of a magnetic field 121 that is preferably perpendicular to the current flow so as to create a Lorentz force perpendicular to the substrate. The magnetic field 121 is generated by a magnetic field generator (not shown) as discussed above. The power source 122 applies the time-varying current stimulus, such as a square current waveform, to the column electrodes connected to the movable elements of the array 120. The current signal may be applied to all movable interferometric modulators in the array 120 simultaneously. Alternatively, a current signal may be applied to only those interferometric modulators from which reflectivity are being measured. A light source 124 illuminates the array 120. In one embodiment, a standard D65 light source is used for the light source 124. The light source 124 provides light 126 to the interferometric modulator array 120, which is then reflected upward.

An optical detector, such as a photo detector 128, may be used to detect the intensity of the reflected light 130 from the interferometric modulator array 120. A diffuser film 132 may be optionally placed over the interferometric modulator array 120. The diffuser film 132 scatters the light 130 reflected from the interferometric modulator array 120. Such scattering allows the light source 124 and detector 128 to be placed at angles 134 and 136 relative to the array 120. While the incident light reflected from the array 120 may be at a maximum if angles 134 and 136 are complementary, the use of a diffuser film 132 allows for detection at an angle differing from the angle of greatest specular reflection. If a diffuser film 132 is not used, then it can be advantageous that incident light 126 fall incident on and reflect back from the array 120 at an angle close to perpendicular to the array 120. Such a configuration is desirable because interferometric modulators can have a narrow viewing angle causing the intensity of reflected light to fall rapidly at wider angles.

A computer 138 in communication with the detector 128 can be used to record reflectivity versus applied current and calculate electrical parameters. The computer 138 can be connected to the power source 122 to provide movable reflective element displacement versus time information relative to the time when the current is applied to the array 120. The computer 138 may also be connected to the magnetic field generator (not shown) to control the magnetic field level and/or waveform characteristics. The computer 138 may also estimate the displacement of the movable element of one or more interferometric modulators using known relationships between reflectance and relative displacement of the movable reflective element and the substrate.

Because a MEMS interferometric modulator display is reflective and inherently specular in nature, it can be advantageous to detect a measure of reflectance of the array of incident light and reflected light that are both normal to the substrate surface (e.g., in-line lighting). In one embodiment, in-line lighting is accomplished using a system illustrated in FIG. 14. In this system, a beam splitter 150 is provided that reflects light from a light source 152 onto the array 120 being evaluated. The path of the light 126 reflected by the beam splitter 150 is normal to the array 120. The power source 122 applies a desired time-varying current stimulus to the array 120 while the light source 152 illuminates the array 120.

A detection module 128 is positioned to detect light 130 reflected from the array 120 and passing through the beam splitter 150. In this way, both the incident light 126 and the reflected light 130 are normal to the array 120. In some embodiments, the system may additionally comprise a microscope objective 154 for evaluating only a small portion of the total active surface area. The array 120 may be placed in probe mount 156 which may then be secured to an X-Y stage 158 for moving the array 120 so that the desired portion of the active area is under the microscope objective 154 for evaluation. The detection module 128 may comprise one or more optical detectors such as a photo detector or spectrometer, and a CCD camera 160.

One or more beam splitters 162 may be used for simultaneous measurement by more than one detector. The light source 152 may be chosen to provide light having the desirable spectral and intensity characteristics. For example, it may be desirable to have the light source 152 approximate the characteristics of the light source that will typically be used to view a display into which the array 120 is intended to be incorporated. In one embodiment, a standard D65 light source is used. In some embodiments, the light source 152 may be coupled to an illumination control device 164, preferably of the Koehler design. The aperture of the illumination control device 164 may be adjusted to illuminate only the area of interest on the array 120 including single interferometric modulators.

A computer 138 in communication with the detector 128 can be used to record reflectivity versus current characteristics (e.g., the hysteresis curve) and calculate parameters including detected movement times of the movable reflective elements of the interferometric modulators. The computer 138 can be connected to the power source 122 to provide movable reflective element displacement time traces relative to the time when the current is applied to the array 120. In some embodiments, the computer 138 can also be used to control the magnetic field 121 generated by a magnetic field generator (not shown).

An embodiment of a system for testing a MEMS device, where the MEMS device includes at least one conductive movable element, includes means for applying an electrical current to the conductive movable element, means for applying a magnetic field to the conductive movable element, and means for detecting a movement of the movable element. With reference to FIGS. 9 and 13, aspects of this embodiment include where the means for applying the electrical current is a power source 204, where the means for applying the magnetic field to the conductive movable element is a magnetic field generator 206, and where the means for detecting the movement of the movable element is an optical detector 128.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others.

What is claimed is:

1. A method of testing an array of interferometric modulators, comprising:
   applying an electrical current to an electrode connected to an movable reflective element of an array of interferometric modulators, the array comprising a plurality of interferometric modulators comprising one or more movable reflective elements, the movable reflective elements coupled to a substrate and contacting a surface in an actuated state, wherein at least one of the movable reflective elements is adhered to the surface in the actuated state;
   applying a magnetic field to the array;
   detecting movement of the movable reflective element, and
   estimating a force required to move the movable reflective element based on a strength of the applied electrical current and a strength of the applied magnetic field.

2. The method of claim 1, the movable reflective elements being spaced apart from the substrate in a relaxed state.

3. The method of claim 1, the movable reflective elements being proximate to or in contact with the substrate in a relaxed state.

4. The method of claim 1, wherein applying the electrical current comprises applying an electrical current waveform.

5. The method of claim 1, wherein applying the magnetic field comprises applying a magnetic field waveform.

6. The method of claim 1, wherein at least a portion of the magnetic field is perpendicular to the current in the electrode.

7. The method of claim 1, further comprising:
   applying the electrical current by applying an electrical current waveform comprising a plurality of pulses of different amplitudes until the movable reflective element moves from the actuated state.

8. The method of claim 7, further comprising:
   recording the amplitude of the electrical pulse applied upon detecting movement.

9. The method of claim 7, further comprising:
   increasing the strength of the applied magnetic field if a maximum allowable electrical pulse does not result in movement of the movable reflective element; and
   continuing to apply the plurality of pulses of different amplitudes until the movable reflective element moves.

10. The method of claim 1, wherein detecting movement of the movable reflective element comprises measuring light reflected from the interferometric modulator containing the movable reflective element.

11. The method of claim 10, wherein measuring the light comprises using a photodetector.

12. The method of claim 1, further comprising:
   applying the electrical current to a common electrode connected to a plurality of movable reflective elements, wherein one or more of the movable reflective elements of the common electrode are adhered in the actuated state; and
   detecting movement of any of the adhered movable reflective elements of the common electrode.

13. The method of claim 1, wherein the magnetic field is substantially perpendicular to the current applied to the electrode and substantially perpendicular to a direction of motion of the movable reflective element.

14. A method of testing a microelectromechanical system (MEMS) device, comprising:
   applying an electrical current to a conductive movable element of the MEMS device;
   applying a magnetic field to the conductive movable element;
   detecting movement of the conductive movable element and
   estimating a force required to move the conductive movable reflective element based on a strength of the applied electrical current and a strength of the applied magnetic field.

15. The method of claim 14, wherein applying the electrical current comprises applying an electrical current waveform.

16. The method of claim 14, wherein applying the magnetic field comprises applying a magnetic field waveform.

17. The method of claim 14, wherein at least a portion of the magnetic field is perpendicular to the applied electrical current.

18. The method of claim 14, wherein the conductive movable element is formed over a substrate and separated from the substrate by a first distance in a first state, and configured to be movable to be separated from the substrate by a second distance in a second state, the method further comprising:
   applying the electrical current and the magnetic field when the movable element is in the first state thereby causing the movable element to move to the second state.

19. The method of claim 18, wherein the first state comprises the movable element being adhered to another structure and the second state comprises the conductive movable element being separated from the other structure.

20. The method of claim 19, further comprising:
   applying the electrical current by applying an electrical current waveform comprising a plurality of pulses of different amplitudes until the conductive movable element moves from the first state; and
   recording the amplitude of the electrical pulse applied upon detecting movement.

21. The method of claim 20, further comprising:
   increasing the strength of the applied magnetic field if a maximum allowable electrical pulse does not result in movement of the conductive movable element from the first state; and
   continuing to apply a plurality of pulses of different amplitudes until the conductive movable element moves from the first state.

22. The method of claim 14, wherein detecting movement of the movable element comprises using a photodetector.

23. The method of claim 22, further comprising determining a displacement of the moveable element upon detecting movement.

24. A system for testing an array of interferometric modulators, comprising:
   a power source configured to apply an electrical current to an electrode connected to an movable reflective element of an array of interferometric modulators, the array comprising a plurality of interferometric modulators comprising one or more movable reflective elements, the movable reflective elements coupled to a substrate and contacting a surface in an actuated state, wherein at least one of the movable reflective elements is adhered to the surface in the actuated state;
   a magnetic field generator configured to apply a magnetic field to the array;

an optical detector configured to detect light reflected from the array and produce a signal corresponding to the detected light; and a computer configured to receive the signal from the optical detector and determine movement of the movable reflective element, wherein the computer is further configured to estimate a force required to move the movable reflective element based on a strength of the applied electrical current and a strength of the applied magnetic field.

25. The method of claim 24, the movable reflective elements being spaced apart from the substrate in a relaxed state.

26. The method of claim 24, the movable reflective elements being proximate to or in contact with the substrate in a relaxed state.

27. The system of claim 24, wherein at least a portion of the magnetic field is perpendicular to the current in the electrode.

28. The system of claim 24, wherein the computer is coupled to the power source and configured to cause the power source to apply an electrical current waveform.

29. The system of claim 28, wherein the computer is further configured to cause the power source to apply an electrical current waveform comprising a plurality of pulses of different amplitudes until the movable reflective element moves from the actuated state.

30. The system of claim 29, wherein the computer is further configured to receive a signal indicating the amplitude of the electrical pulse applied when movement was determined.

31. The system of claim 24, further comprising an illumination source configured to illuminate the array.

32. A system for testing a microelectromechanical system (MEMS) device, comprising:
a power source configured to apply an electrical current to a conductive movable element of the MEMS device;
a magnetic field generator configured to apply a magnetic field to the conductive movable element;
an optical system configured to detect movement of the movable element, and
a computer configured to estimate a force required to move the movable element based on a strength of the applied electrical current and a strength of the applied magnetic field.

33. The system of claim 32, wherein the computer is coupled to the power source and is further configured to cause the power source to apply an electrical current waveform.

34. The system of claim 32, wherein at least a portion of the magnetic field is perpendicular to the applied electrical current.

35. A system for testing a microelectromechanical system (MEMS) device, wherein the MEMS device comprises at least one conductive movable element, the method comprising:
means for applying an electrical current to the conductive movable element;
means for applying a magnetic field to the conductive movable element;
means for detecting a movement of the movable element, and
means for estimating a force required to move the conductive movable element based on a strength of the applied electrical current and a strength of the applied magnetic field.

36. The system of claim 35, wherein the means for applying the electrical current comprises a power source.

37. The system of claim 35, wherein the means for applying the magnetic field comprises a magnetic field generator.

38. The system of claim 35, wherein the detecting means comprises an optical detector.

39. The method of claim 1, wherein the detected movement of the movable reflective element is movement from an actuated state to a non-actuated state.

40. The method of claim 1, further comprising estimating a force of stiction based on the estimated force required to move the conductive movable element.

41. The method of claim 1, wherein the strength of the applied electrical current and the strength of the applied magnetic field are as of when the movement is detected.

42. The method of claim 14, wherein the detected movement of the conductive movable element is movement from a first state to a second state.

* * * * *

UNITED STATES PATENT AND TRADEMARK OFFICE
CERTIFICATE OF CORRECTION

| | | Page 1 of 1 |
|---|---|---|
| PATENT NO. | : 7,545,556 B2 | |
| APPLICATION NO. | : 11/614795 | |
| DATED | : June 9, 2009 | |
| INVENTOR(S) | : Kasra Khazeni | |

It is certified that error appears in the above-identified patent and that said Letters Patent is hereby corrected as shown below:

| On the Title Page | Line | Description of Error |
|---|---|---|
| (Item 56) Page 2 | 19 | Under Other Publication, change "Mechnical" to --Mechanical--. |
| Col. 24 | 9 | In Claim 14, change "element" to --element,--. |

Signed and Sealed this

Ninth Day of February, 2010

David J. Kappos
*Director of the United States Patent and Trademark Office*